April 28, 1964   G. F. BOWDEN ETAL   3,130,470
CONCRETE WALL FORM INSTALLATION
Filed Jan. 24, 1961   15 Sheets-Sheet 10
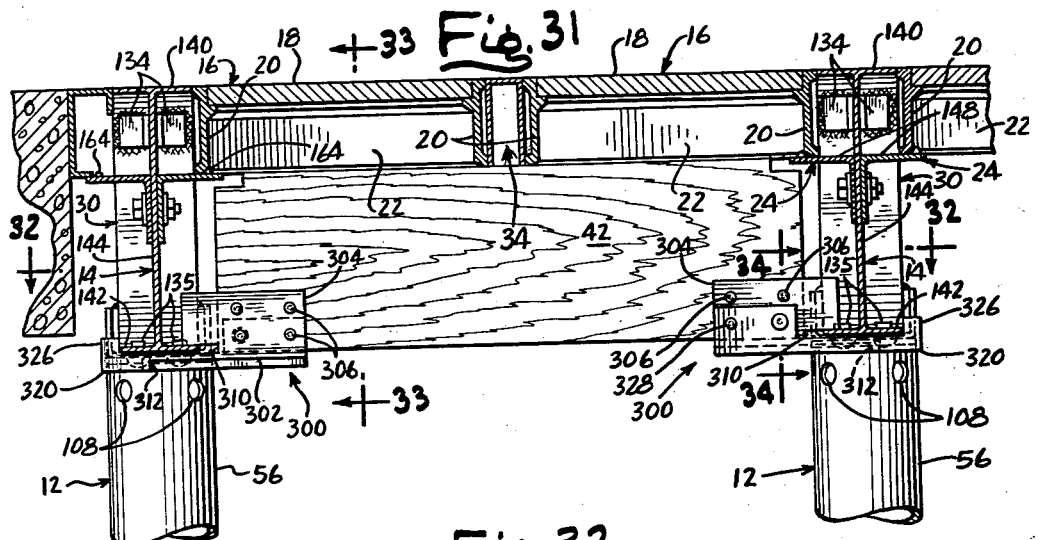
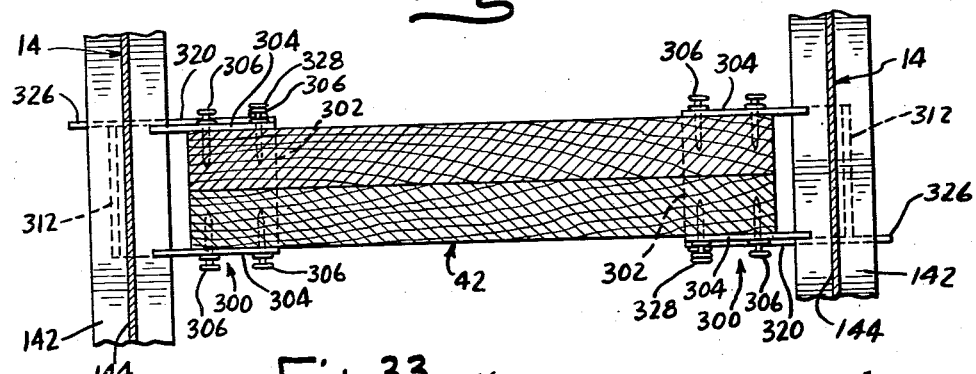
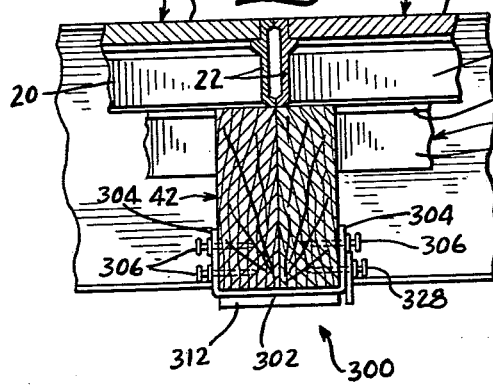
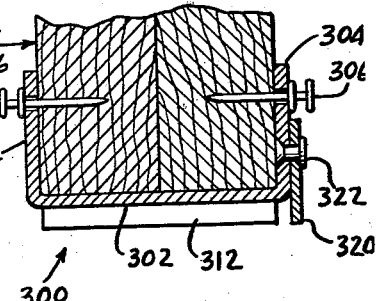
INVENTORS
GEORGE F. BOWDEN
BYRON RUTH
BY
ATTY.

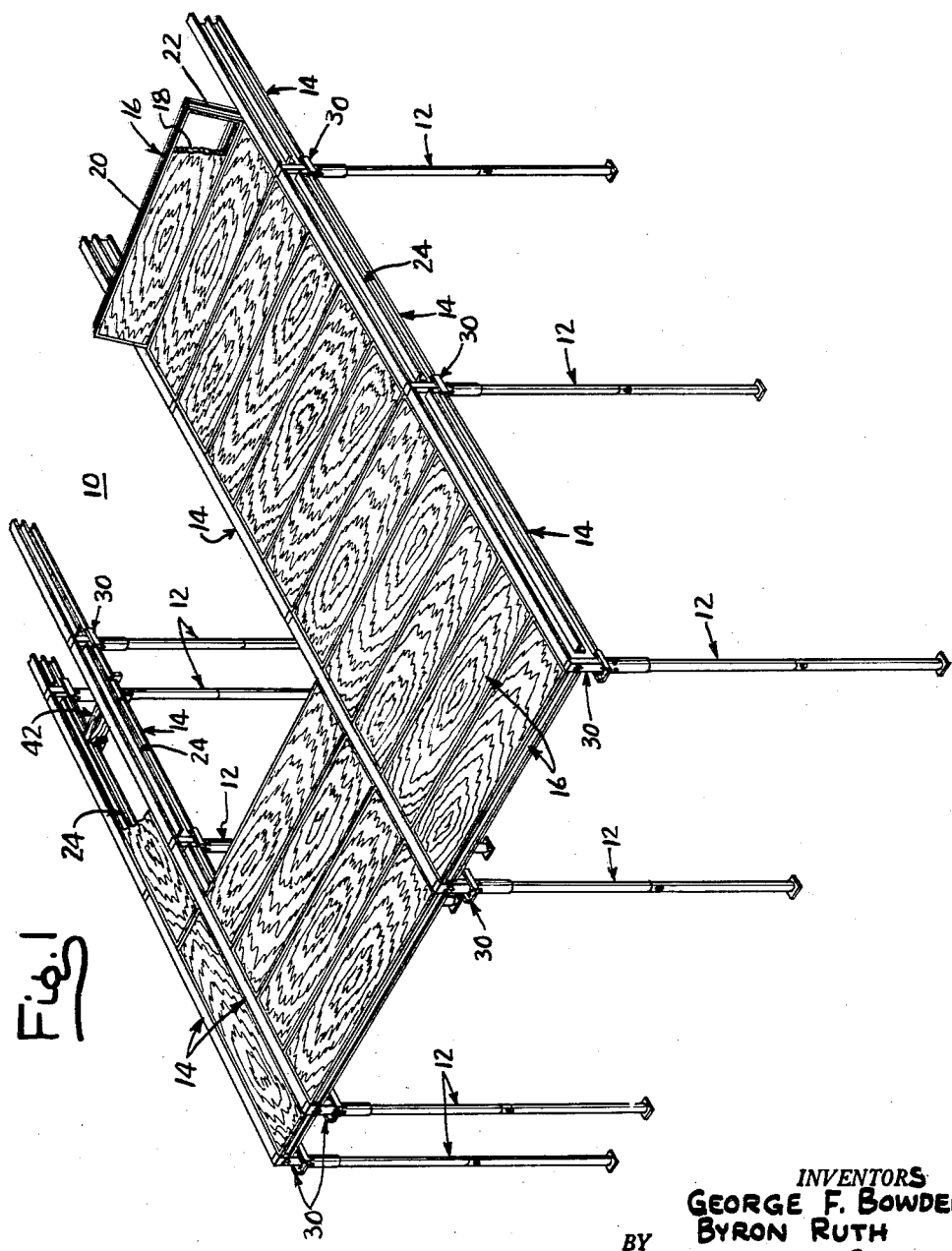

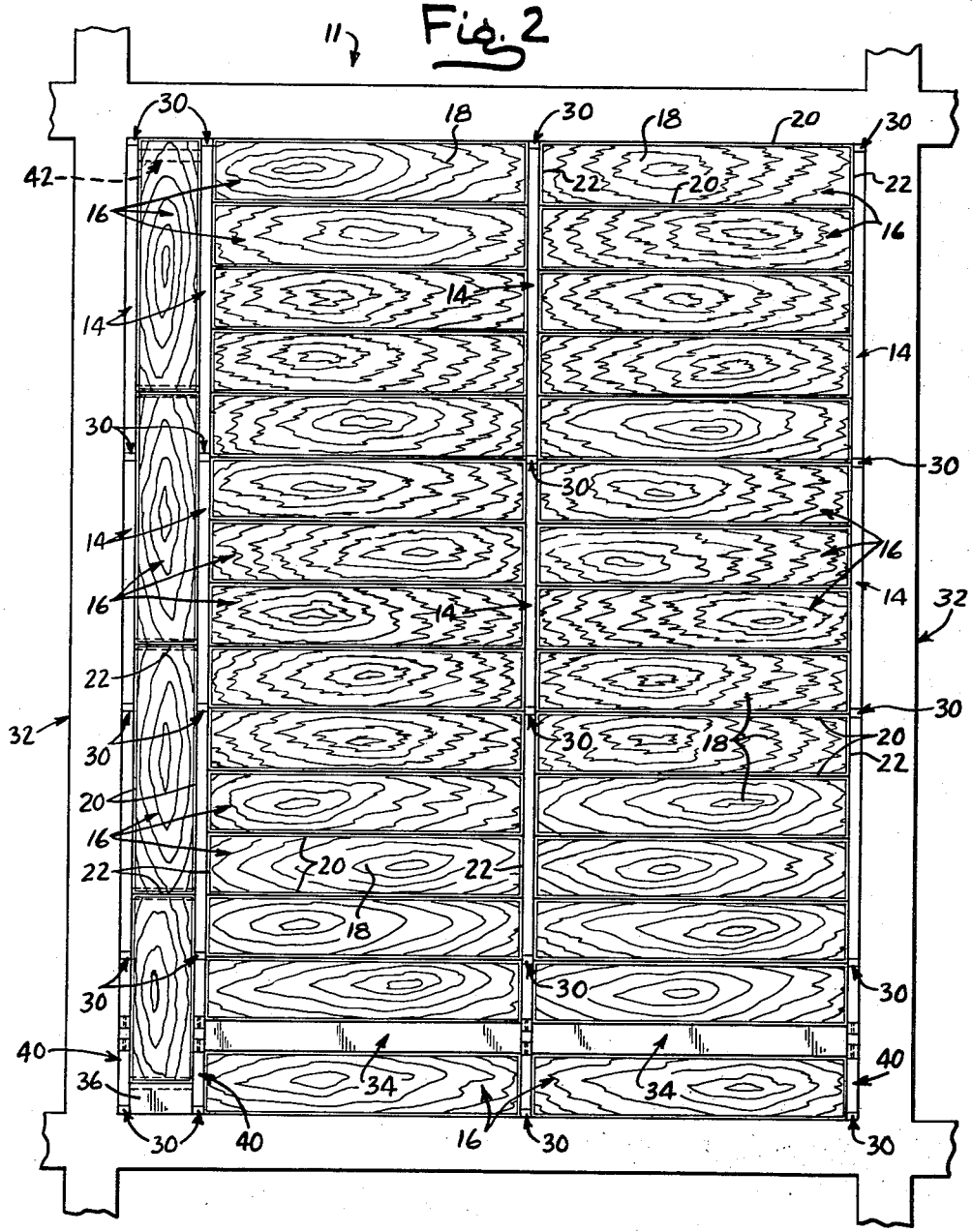

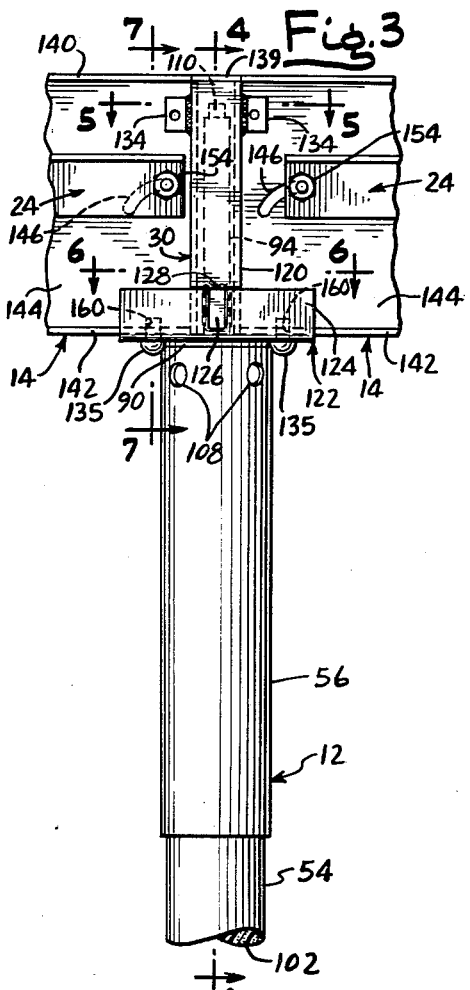

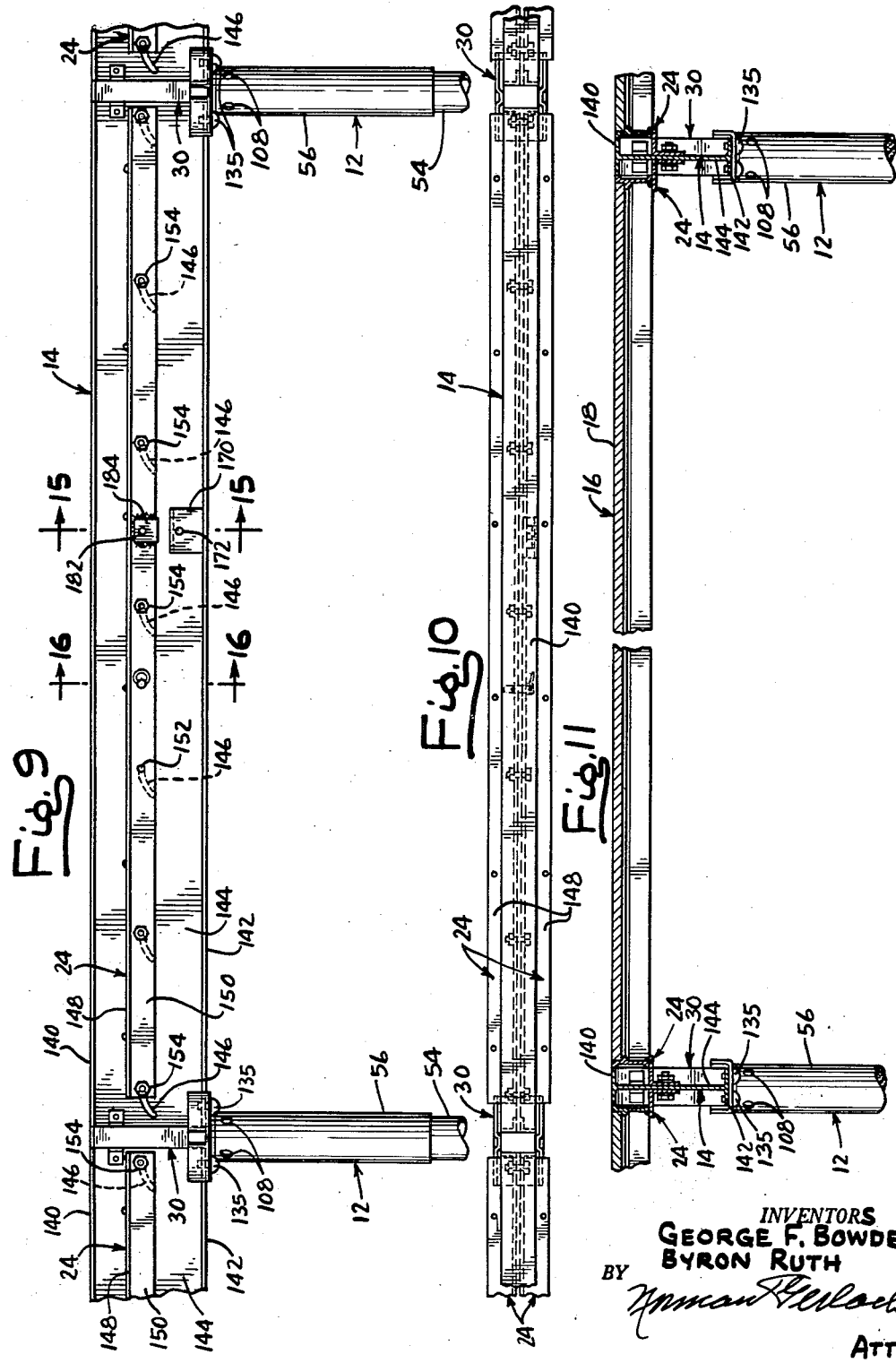

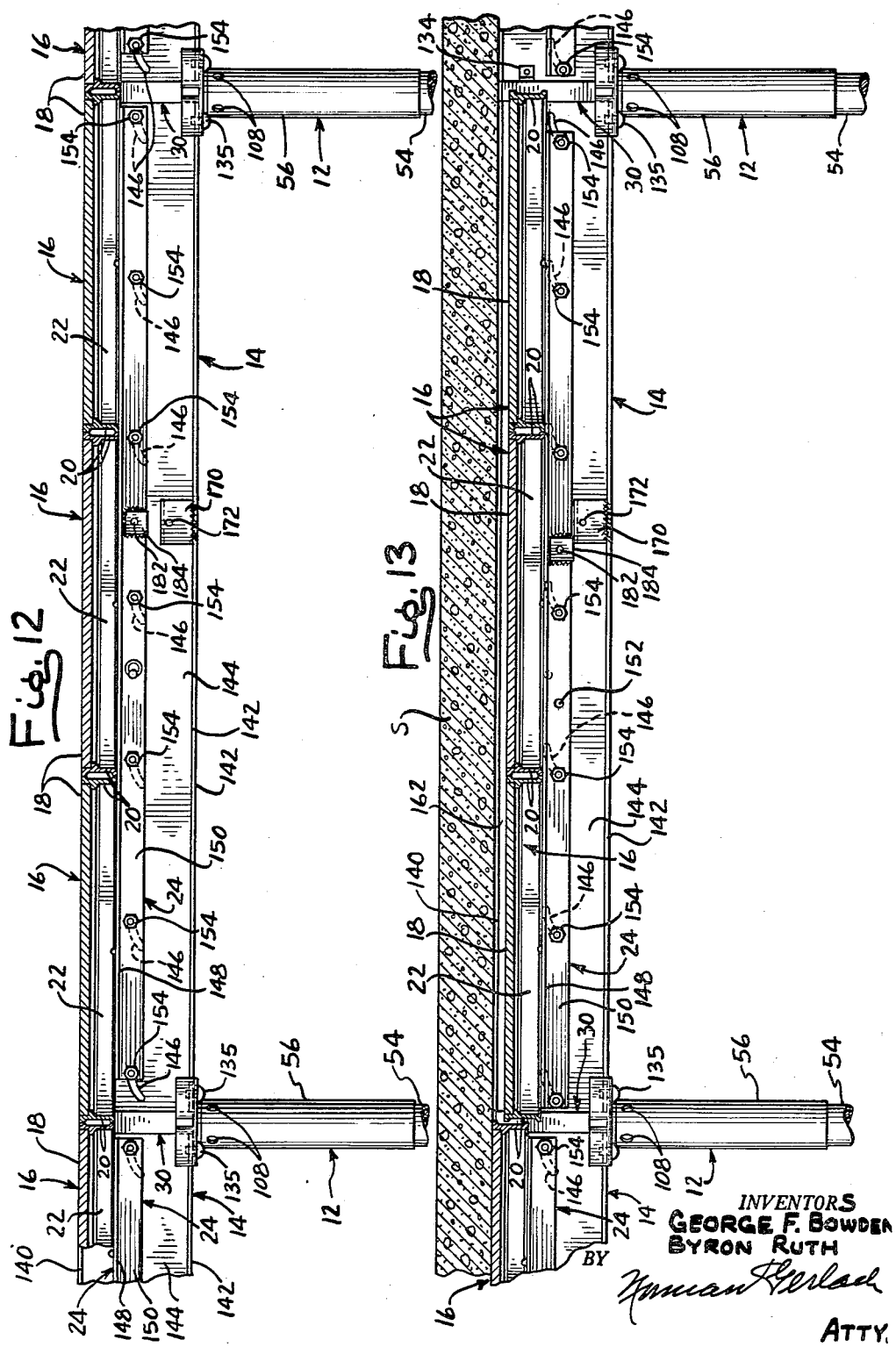

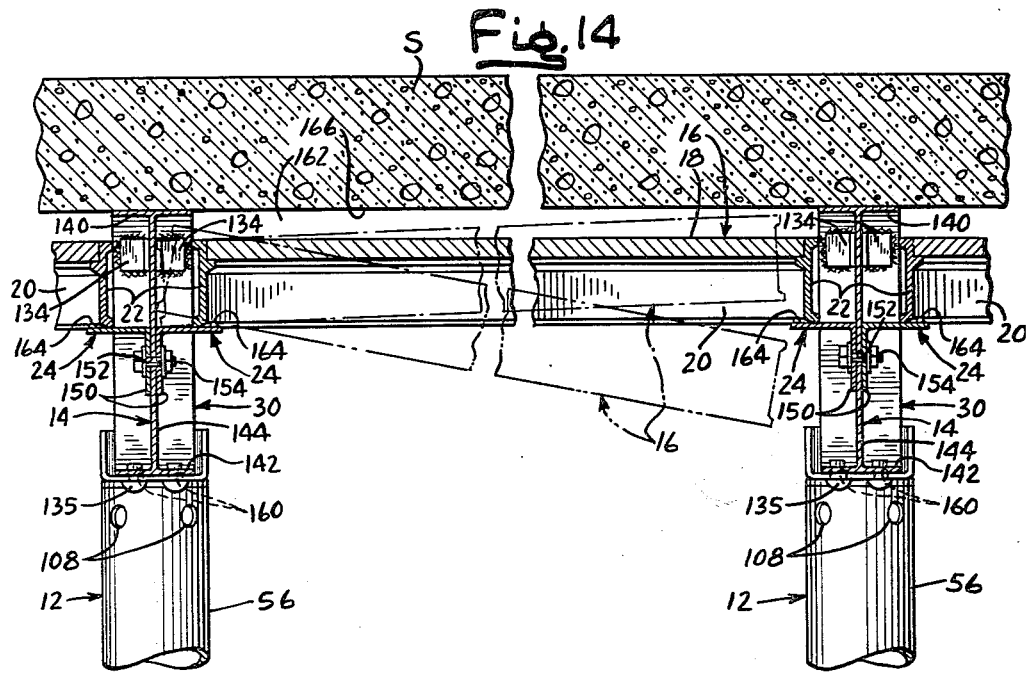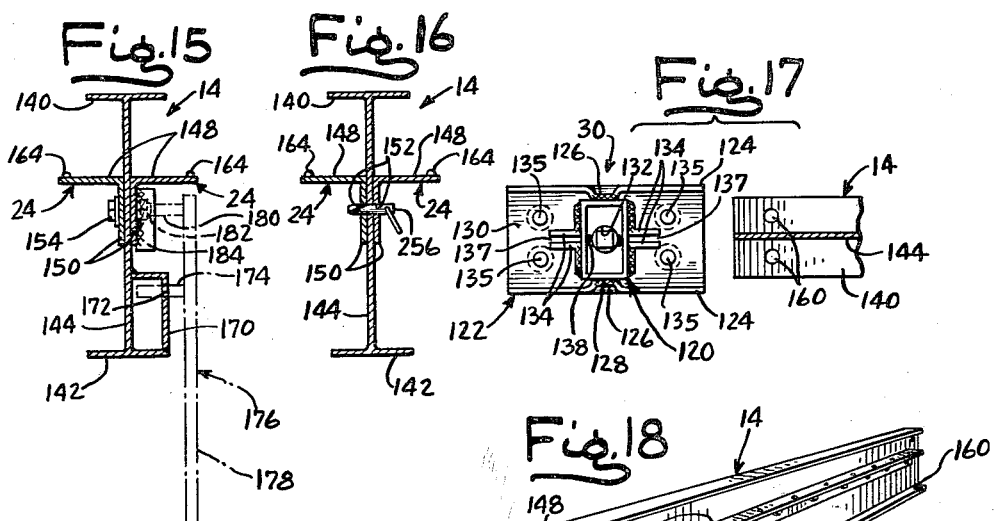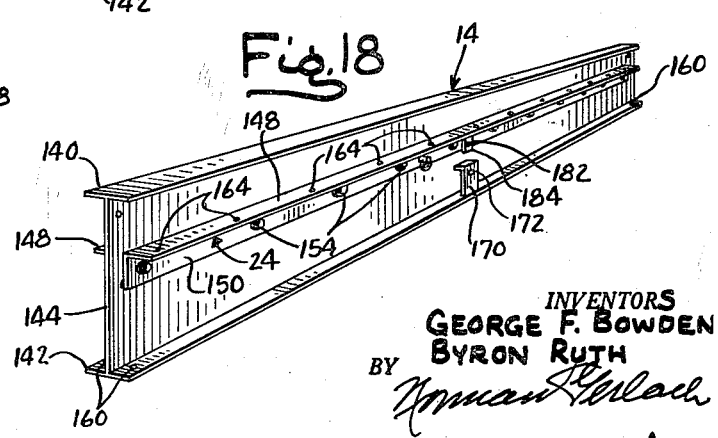

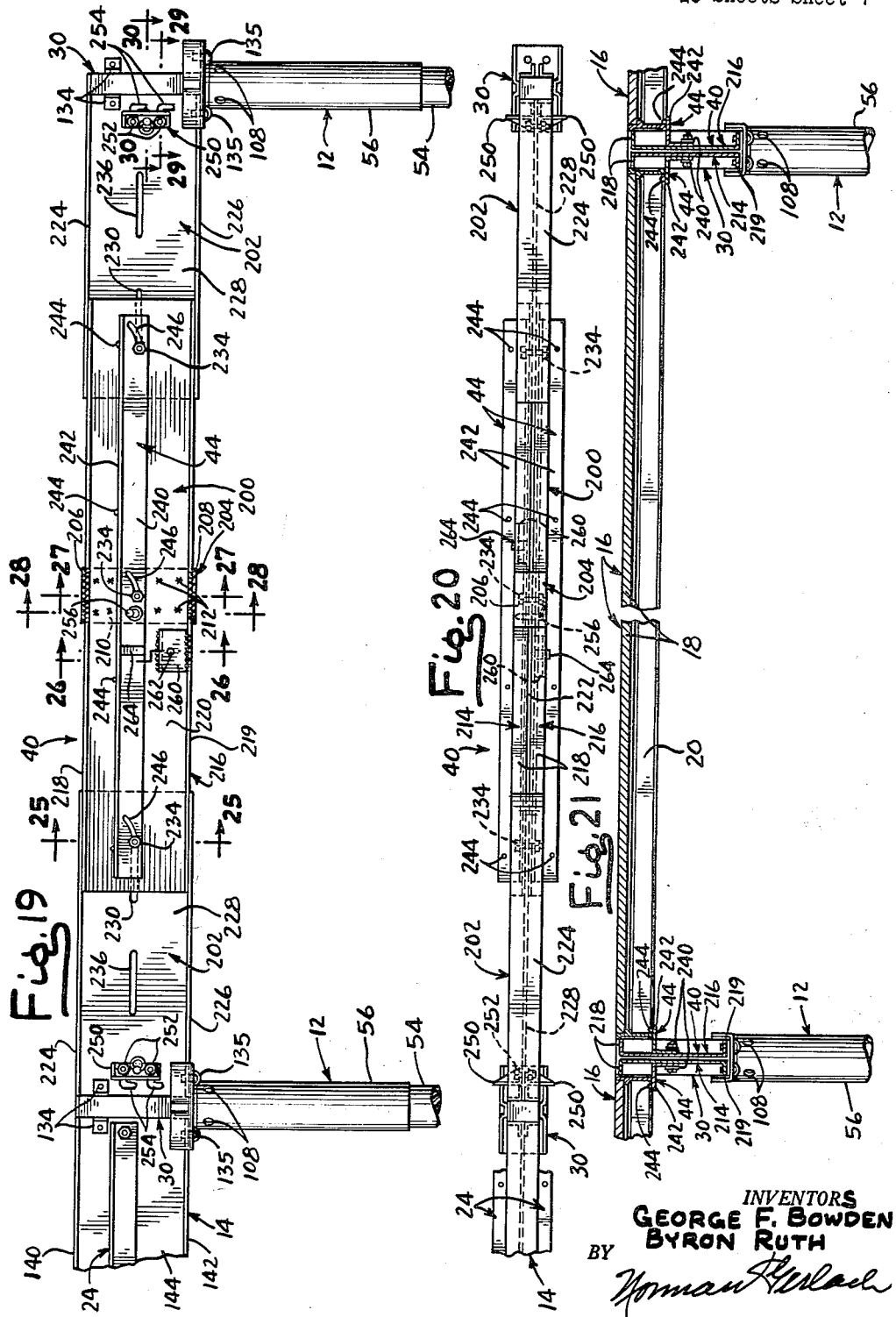

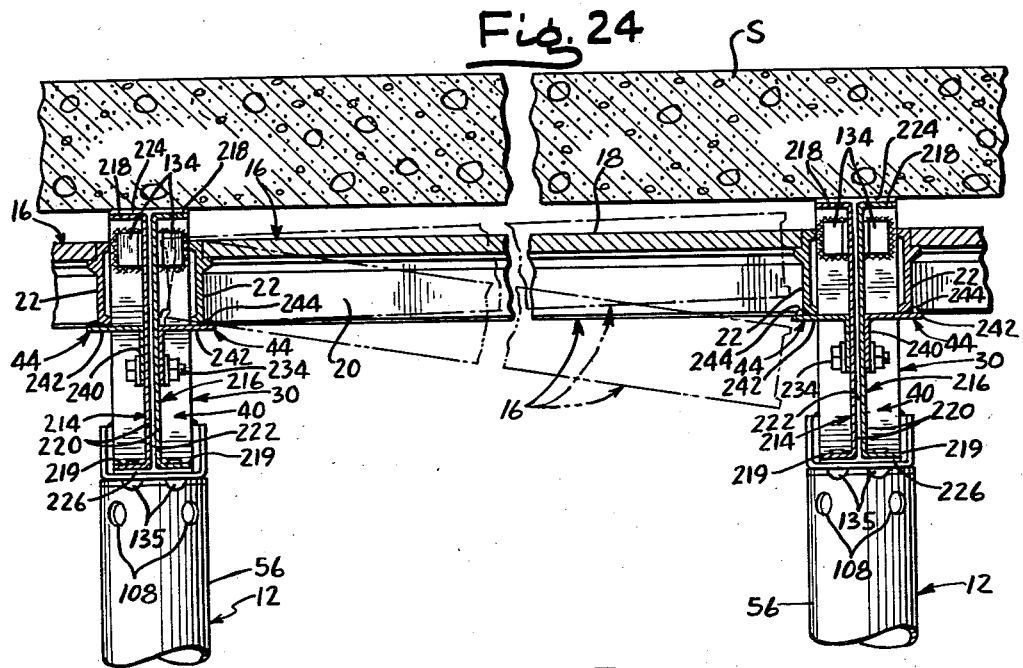

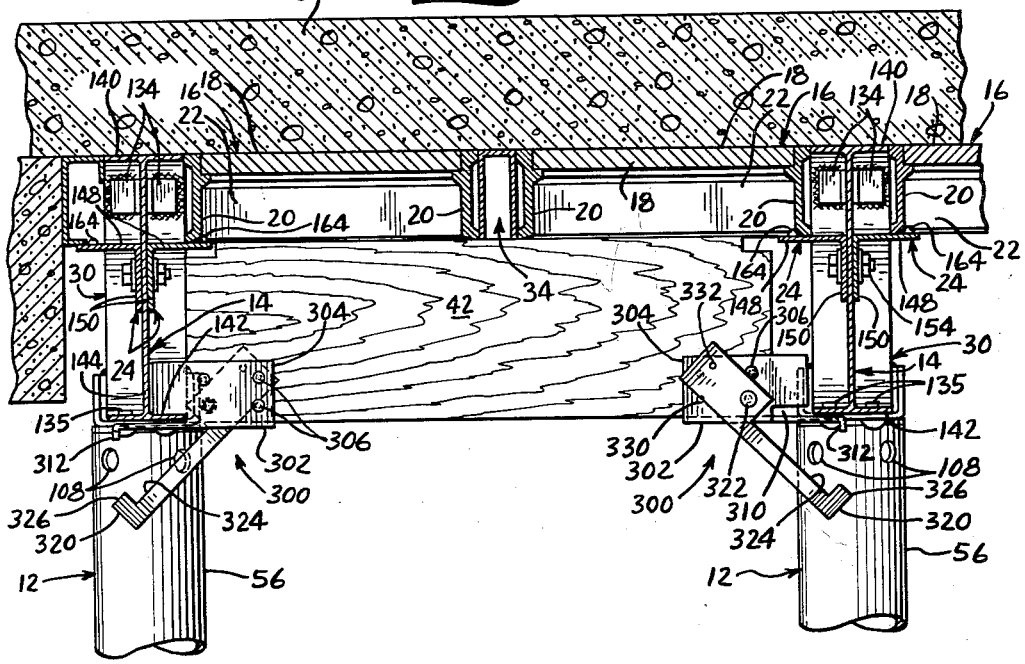
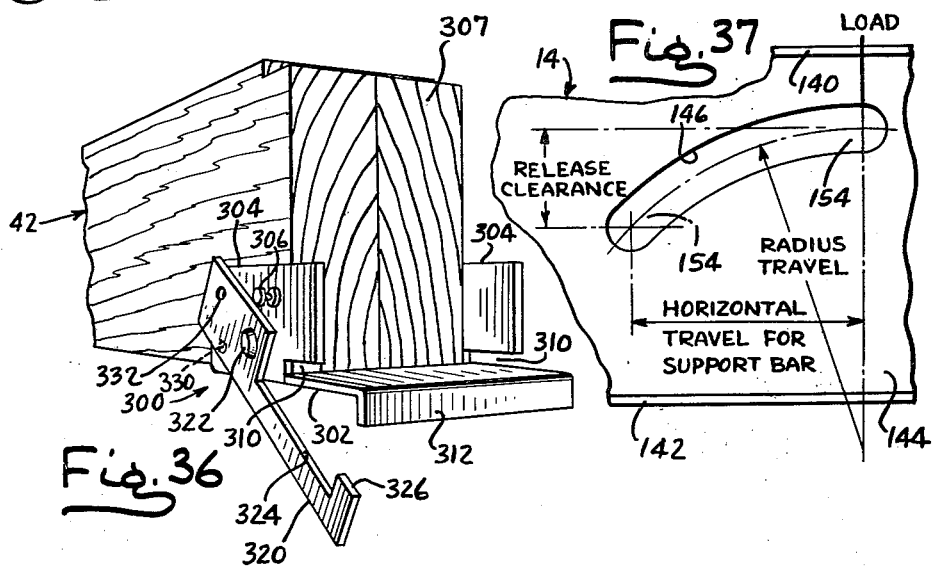

April 28, 1964 G. F. BOWDEN ETAL 3,130,470
CONCRETE WALL FORM INSTALLATION
Filed Jan. 24, 1961 15 Sheets-Sheet 12
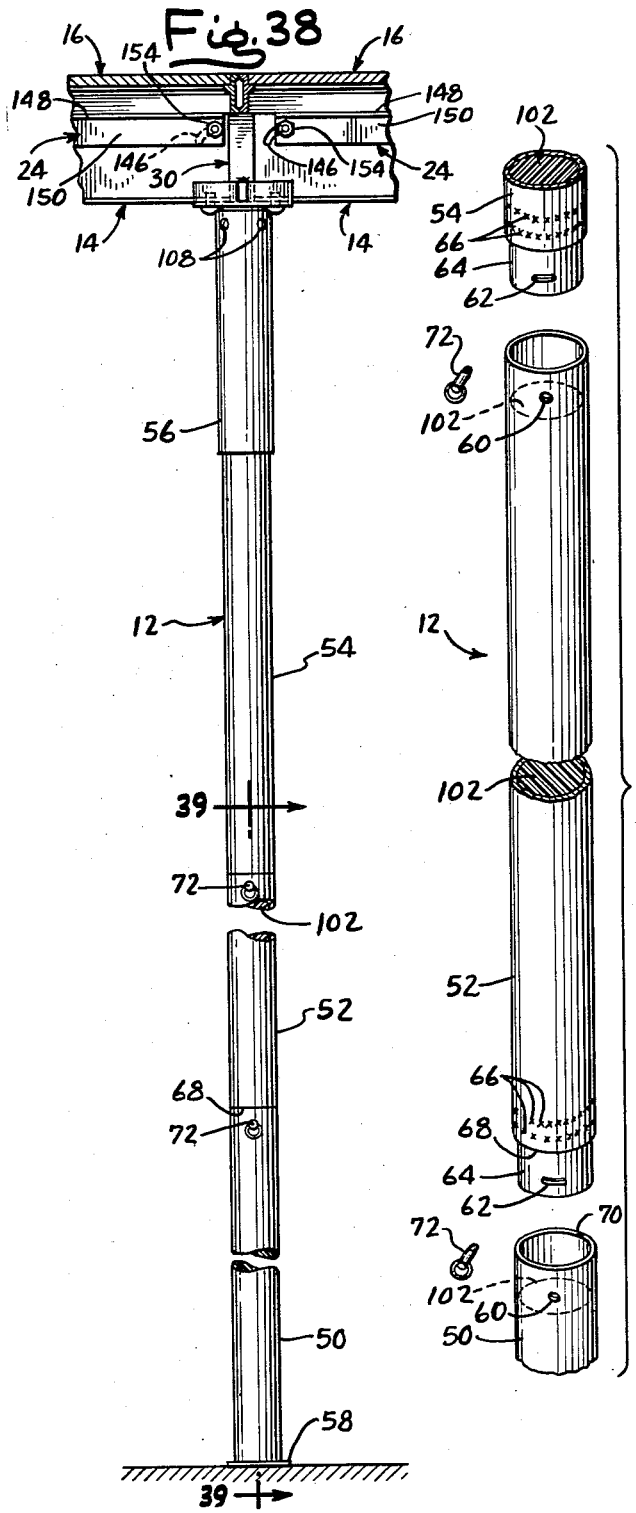
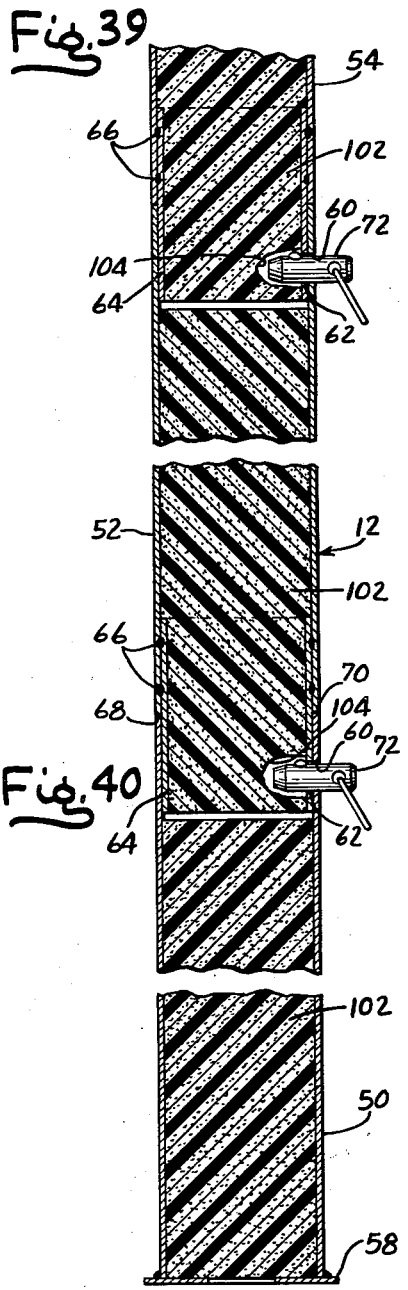
INVENTORS
GEORGE F. BOWDEN
BYRON RUTH
BY
ATTY.

April 28, 1964          G. F. BOWDEN ETAL          3,130,470
CONCRETE WALL FORM INSTALLATION
Filed Jan. 24, 1961                              15 Sheets-Sheet 13
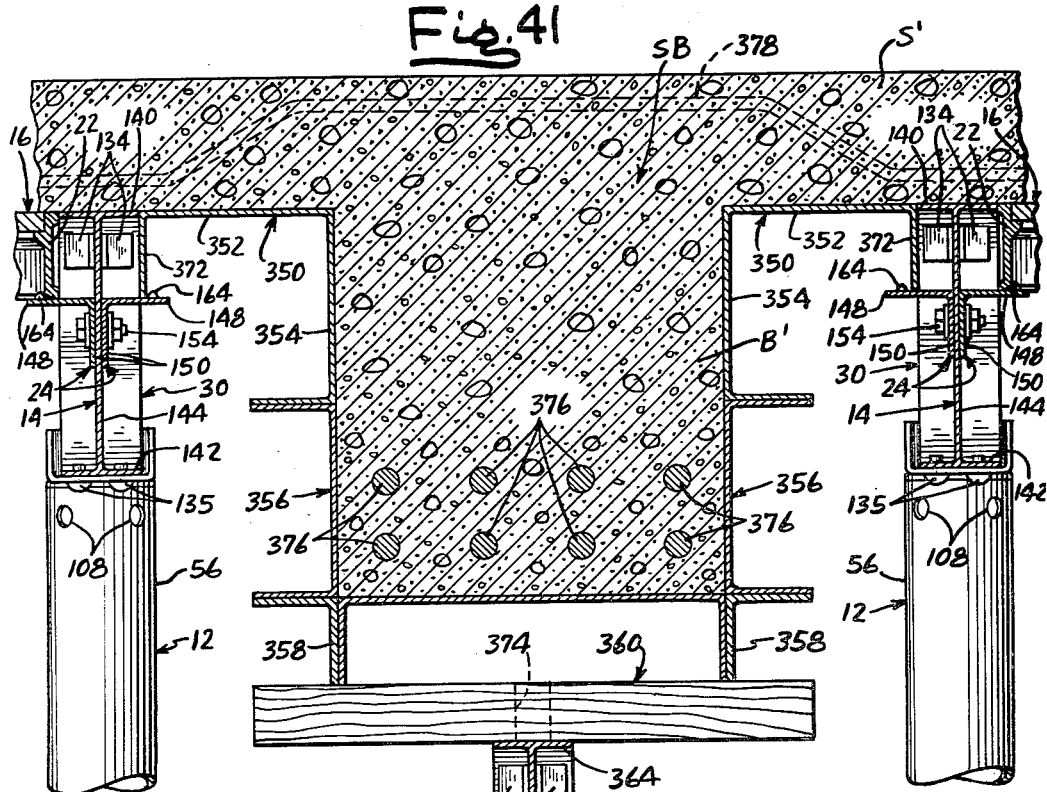
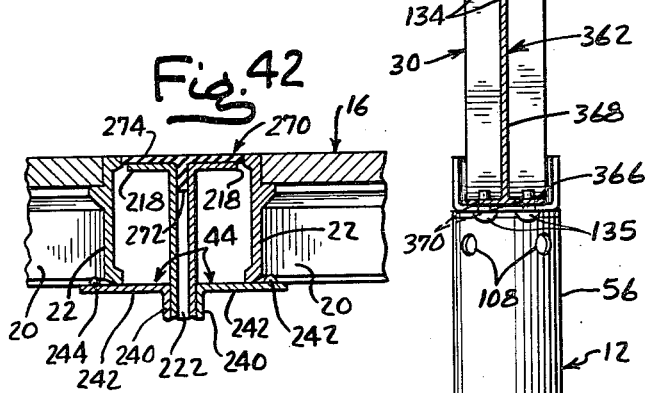
INVENTORS
GEORGE F. BOWDEN
BYRON RUTH
BY
ATTY.

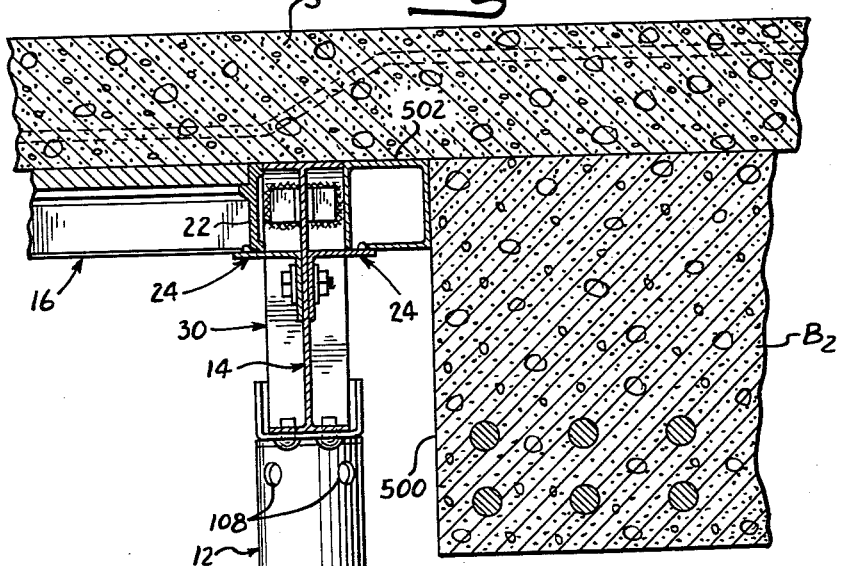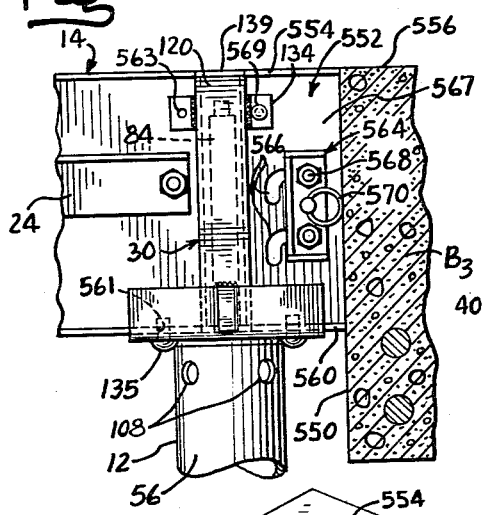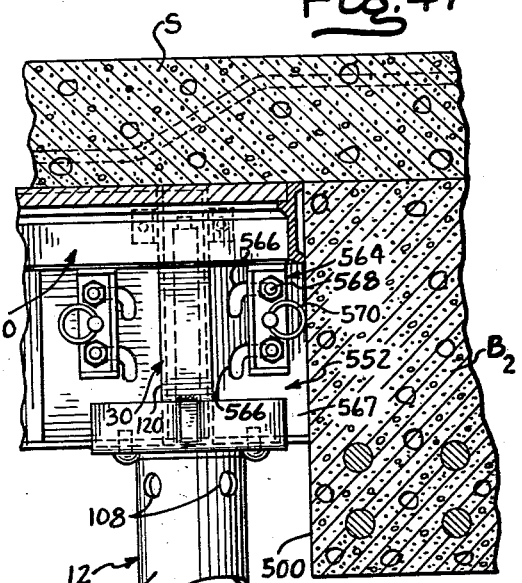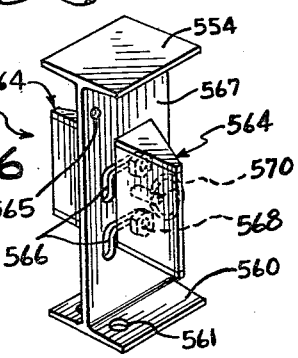

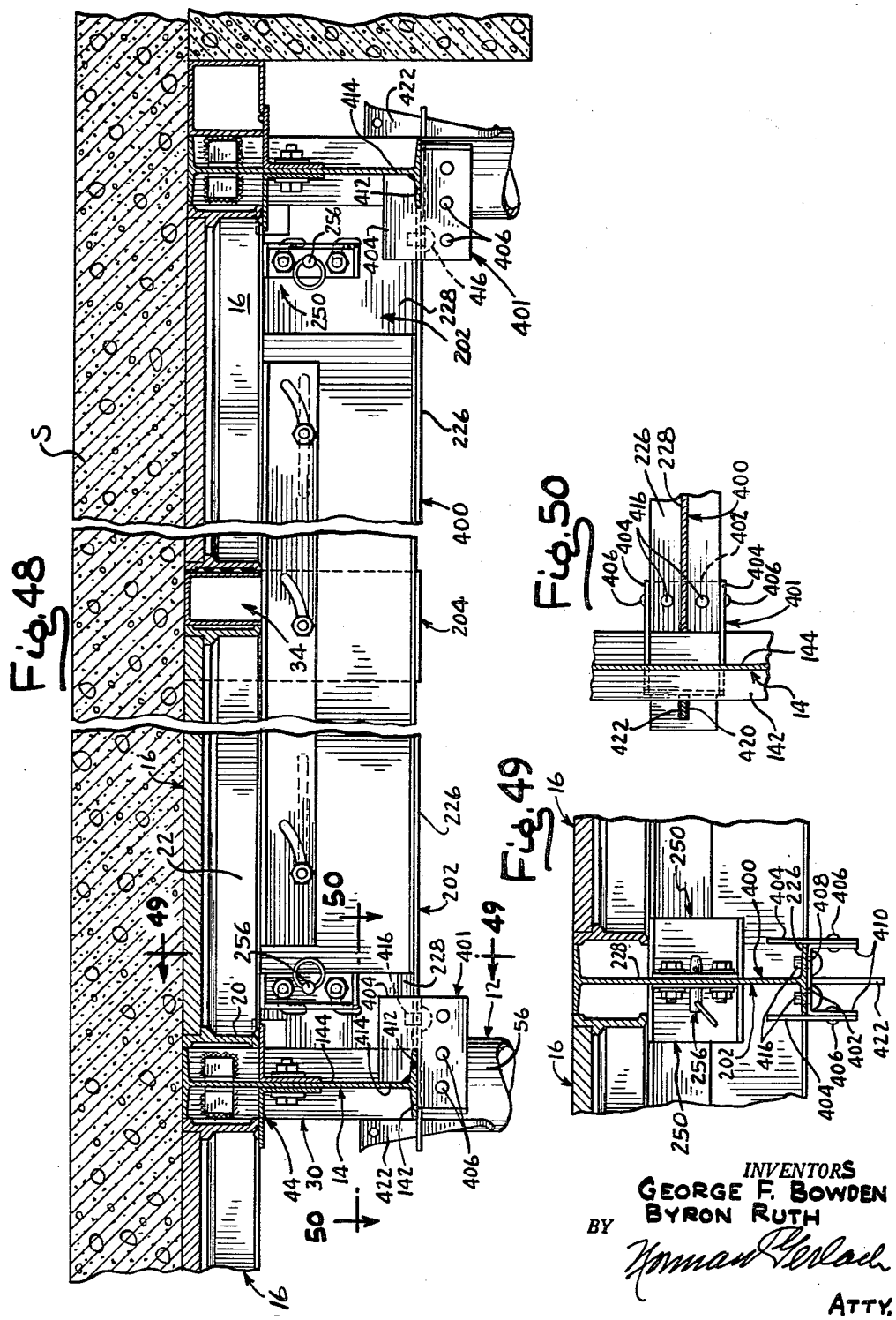

United States Patent Office 3,130,470
Patented Apr. 28, 1964

3,130,470
CONCRETE WALL FORM INSTALLATION
George F. Bowden, Des Plaines, and Byron E. Ruth, Chicago, Ill., assignors to Symons Mfg. Company, a corporation of Delaware
Filed Jan. 24, 1961, Ser. No. 84,574
11 Claims. (Cl. 25—131.5)

The present invention relates to building constructions and has particular reference to a method of and apparatus for erecting the superimposed concrete slabs which form the basis for the floors and ceilings of a building construction. Stated otherwise, the invention is specifically concerned with a building erection system which involves the use of several novel articles of concrete hardware, including major items such as novel shores and stringers for supporting the panel forms in position, and novel minor items such as various supporting brackets, shore-to-stringer connections, inter-stringer connections, grout seals, locking devices, fill-in pieces for making up either longitudinal or transverse odd dimensions, and special tools for installing and removing such articles of concrete hardware.

The successful use of the present system is largely dependent upon the various items of hardware employed and by the use of this system and of the hardware associated therewith, the time involved in the erection of any given building is very materially reduced, thus affording an appreciable saving in labor costs, while at the same time a very substantial reduction in the quantity of materials required at the scene of any given operation is effected.

In the erection of any concrete building structure which includes a series of concrete slabs such as floor slabs, it is desirable to remove the slab-supporting form panels at as early a time as possible after pouring of the concrete so that these panels may be released for subsequent use in another part of the building construction. Heretofore, in conventional systems for erecting a building, the panels which support the slabs have not been available for use until after the concrete has become set and has gained sufficient strength to justify removal, not only of the panels, but of the stringers upon which the panels are supported, and also of the shoring which supports the stringers. Such prolonged curing or hardening of the concrete has been found necessary inasmuch as no provision exists for detaching the panels from the stringers without first removing the latter to release the panels for such detachment. Similarly, no provision exists for removing the stringers without first removing the shoring upon which the stringers are supported.

Where large area concrete slabs are concerned, it has been possible to effect a progressive release of small localized groups of panels by first removing the shoring and stringers in a localized region beneath a slab and, after the group of panels which are supported upon such stringers have been removed, the shoring and stringers are replaced beneath the slab to lend support to the slab while adjacent shoring and stringers are removed to effect release of another localized group of panels. After removal of the second group of panels, the shoring and stringers are again replaced beneath the slab and the process is repeated for the removal of a third group of panels, then a fourth, and so on until all of the panels which support the slab have been removed and the shoring and stringers put back beneath the slab. An appreciable length of time is then allowed for the concrete to attain full strength, after which the shoring and stringers may be finally and permanently removed. The panels which have thus been progressively removed from beneath the slab are available for reuse at different locations in the installation or building being erected.

It is obvious that the above-outlined procedure by means of which groups of panels are progressively made available for reuse entails a considerable amount of manual labor. Furthermore, the character of the labor involved is such that it cannot be performed en masse inasmuch as removal of one small selected group of form panels is a prerequisite to the subsequent removal of another group of such panels. Since each panel removal operation involves the taking down and putting back of the shoring and stringers associated with the group of panels undergoing removal, and since each panel removal operation must await complete performance of the previous panel removal operation, including restoration of the shoring and stringers, adjustment of the shoring to compensate for panel withdrawal, or alternatively, the insertion of filler pieces to make up for panel removal, the rate at which the panels can be made available for subsequent use is not a rapid one. In certain installations, the rate of panel reclamation for subsequent panel reuse is not sufficiently great as to justify the labor involved and the slab-supporting panels are allowed to remain in place until the concrete has attained sufficient strength to permit complete removal of all formwork including the panels, stringers and supporting shoring. Where panel removal is resorted to, however, there is always an initial period, sometimes amounting to as long as ten days, during which the concrete must remain supported while it attains sufficient strength to permit the pulling down of even a limited section of shoring and stringers for release of the first group of form panels as outlined above.

The relatively great amount of labor involved and the slow rate of release of form panels are not the only disadvantages associated with present-day attempts to secure an early release of panels for subsequent reuse in an installation. Where the panels are progressively released in groups, as briefly outlined above, the temporary removal of sections of shoring and stringers for panel-releasing purposes, however short the period of time, places an undue and premature stress upon the concrete which has not yet attained full strength, and frequently results in the creation of small hair-line cracks and other regions of weakness which permanently weakens the structure.

In its broadest aspect, the present invention is designed to overcome the above-noted limitations that are attendant upon present-day efforts to effect early release of panels so that such panels may find further use in a given installation undergoing erection and, toward this end, the invention contemplates the provision of a system of erecting concrete structures and including novel stringer assemblies, shoring units, stringer-to-shore connections, stringer-to-panel connections, and other special articles of concrete hardware which, when used according to the system, will enable the form panels to be removed from beneath a slab during a single uninterrupted removal operation without necessitating removal of the supporting stringers and shoring, or, in fact, without necessitating relieving the supporting pressure exerted by the same upon the slab.

By such an arrangement, all of the panels associated with a given slab may be removed substantially en masse and made available for reuse at the same scene of operations, or elsewhere, as a basis for subsequent slab-forming, wall-forming or foundation-forming operations, such removal of panels taking place at a comparatively early time after the concrete of the slab has been poured. Because of the fact that the form panels are readily removable from the stringers which support them, and because of the fact that the stringers remain in a supported position beneath the concrete slab in supporting relationship relative to the slab, it is not necessary to wait for the concrete to attain strength in excess of that required to render the over-panel areas of the concrete self-supporting when the panels are removed. Furthermore, all of the panels beneath the slab are available at one time and the labor involved in effecting their release from the form structure is materially simplified, while the hazards attendant upon handling of the heavy stringers and their supporting shoring is completely eliminated.

The various items of concrete hardware which serve to make the above-outlined system of concrete form erection possible contribute variously to the rapidity and ease of erection and dismantling of any given installation. For example, a novel form of shoring associated with the system makes provision for small incremental elevational adjustment of the panels after they have been placed in position on the stringers either from above the panels or from below the same. Thus, a workman, operating above or below the panels, may effect elongation or shortening of a given shore member to raise or lower, as desired, an end of a stringer which is connected to such shore member and on which the panels are supported. This feature of dual adjustment for height constitutes one of the principal features of the present system, and the novel shore unit which makes provision for such dual adjustment constitutes an important element of the system.

The novel shore members associated with the system and briefly outlined above are possessed of additional advantages, one of which resides in their tubular construction and in the use of sections of insert tubing by means of which the over-all length of the shore members may be varied at will in relatively large increments of adjustment, while at the same time, positive alignment of the various shore sections is assured so that the tendency to bend under load will be reduced to a minimum. This provision for effecting a coarse adjustment of the shore members for height is entirely independent of the provision for effecting a fine or infinite adjustment, as mentioned above.

The dual adjustment of shore members for height, either from above or from below the panels, as outlined above, is made possible by virtue of a novel shore-to-stringer connection in the form of a bracket which may be regarded as comprising a component part of the shore assembly and which has associated therewith means for effectively supporting one end of a stringer or adjacent ends of a pair of aligned stringers. This supporting means not only assures end register and alignment of the two adjacent ends of the stringers, but it also holds the stringers squarely in position on the upper end of the shore and prevents both lateral displacement and tilting movements of the stringers. The shore-to-stringer supporting bracket also is so designed that after the stringers are in place thereon and the panels operatively positioned on the stringers, no interference is offered by the bracket to adjustment of the shore members for height either from above the panels or from below. The bracket also serves as a protective enclosure for a portion of the adjustment mechanism associated with the shore members.

Still another feature associated with the shore members is the use of a special plastic foam filler material which, when introduced into the interior of the shore member, prevents indenting of the shore member or buckling thereof under stress. A further feature of the present novel shore member resides in the provision of effective sealing means for preventing the infiltration of grout or moisture into the interior of the tubular shore body or into the shore-to-stringer bracket during concrete pouring operations, thus affording protection to the mechanical height-adjusting means associated with the shore member and preventing fouling of the wrench-receiving torque-applying member which is associated with the adjusting mechanism.

An extremely important feature of the present invention resides in the provision of a novel form of stringer member per se. Such a stringer member has associated therewith means for effecting release of all of the panels supported thereby without the necessity of removing the stringer from its supporting position with respect to the concrete slab which it directly supports.

Heretofore, in the erection of concrete structures involving relatively massive, extensive, horizontally disposed, concrete slabs, according to all known methods, it has been the practice to arrange the form panels for the slab in edge-to-edge relationships with their end regions resting directly on top of the stringers so that the stringers completely underlie the panels. The stringers themselves are, of course, supported by suitable shoring members. It is obvious that with the horizontal stringers supported upon the upper ends of the vertical shore members, and with the form panels resting upon the stringers, after the concrete of the slab has been poured upon the upper surfaces of the panels, it is impossible to remove the panels without first taking down both the stringers and shoring which support the panels. The novel stringers associated with the present system are so designed as to support the various form panels so that the upper faces of the panels are coplanar. These stringers, when in their operative panel-supporting position present upper edge surfaces which are also coplanar with and constitute an extension of the form panels so that all of the panels and all of the stringers which support the panels, in combination with one another, present a substantially continuous horizontal unbroken or uninterrupted planar surface which constitutes the surface onto which the wet concrete is poured for slab-forming purposes. The adjacent ends of the form panels, instead of being supported upon the upper edges of the stringers as in conventional erection methods, are supported upon bars which are movably carried on the sides of the stringers. The ends of the panels rest upon the upper edges of these bars and the bars are movable between elevated operative positions wherein they maintain the end edges of the panels in exact horizontal register with the top surfaces of the stringers and lowered positions wherein the vertical distance between the upper faces thereof and the upper faces of the stringer bodies is appreciably greater than the over-all thickness of the panels. Thus, in their lowered positions, in an operative installation with the panels resting thereon, the ends of these panels are free and, by proper manipulation of the panels, the same may be removed from beneath the poured and partially hardened slab, while at the same time the upper surfaces of the stringer bodies remain in place against the underneath side of the slab so that the latter remains supported during panel-removing operations. By such an arrangement, at no time is the supporting pressure exerted by the shoring and stringers against the underneath face of the concrete slab relieved and, except for the necessary movement of the support bars for panel-releasing purposes, the shoring and stringers supported thereby remain undisturbed. In its broadest aspect, therefore, the invention contemplates the provision of a stringer having means at the side thereof for supporting the end regions of a series of panels and having an upper edge surface which, when the panels are supported from the sides of the stringer, lie flush with the panel facings so that the panels and stringers establish a continuous slab-supporting surface onto which the wet concrete is poured, together with means for dropping the side supports after the concrete was hardened to release the panels while allowing the stringers to remain in place and in their slab-supporting relationship.

Briefly, in a contemplated commercial embodiment of the stringers, the same are designed to accommodate the use of prefabricated panel units of the type which is shown and described in United States Patent No. 2,-997,769, granted on August 29, 1961 and entitled "Tie Rod Assembly for Concrete Form Panels." Such panels are commonly known as "steel ply" panels. The various panel units are each in the form of a generally rectangular plywood facing having a marginal reinforcing frame including longitudinal and transverse frame bars which are formed of steel. The entire structure is generally in the form of a rectangular shallow tray, the bottom of which is the plywood facing and the sides of which are the marginal steel frame bars. The stringers for supporting these steel ply panels are generally in the form of I-beams. The web portion of the I-beam is provided on opposite sides thereof with vertically movable rails or support bars which, when in their uppermost or raised position, are disposed below the top flange of the I-beam a distance precisely equal to the thickness of one of the steel ply panels. Thus, with the panel edges resting upon a support bar and with the latter serving as a shelf or support, the plywood facings of the panels are in contiguity with the top flange of the stringer so that the concrete may be poured over the panels and stringers which present a substantially smooth, unbroken, continuous, concrete-receiving surface. Locking means are provided for maintaining the rails in their elevated positions. After the concrete has hardened, the locking means is released and the support bars will drop through a distance of a few inches, whereupon the panels may readily be stripped from beneath the concrete while the top flanges of the stringers remain in their supporting relationship with respect to the slab. In order to move the support bars between their lowered and their elevated positions, the bars and the stringer body upon which the bars are movably mounted are provided with respective reaction shoulders designed for cooperation with the effective fulcrum and operating point associated with a manually operable lever.

Steel ply panels of the type briefly described above are constructed in standard sizes which vary both as to length and width. It frequently happens, therefore, that when all of the panels which cooperate to make up the slab form are arranged in edge-to-edge relationship to produce the surface upon which the concrete is poured, there will be an odd dimension, either longitudinal or transverse, or both, which cannot be accommodated by the use of standard size panels. Heretofore, these odd dimensions in a longitudinal direction relative to the slab have been made up by the use of specially constructed panels or stringer filler pieces, and to make up for such odd dimensions insofar as the stringers are concerned, it has been necessary to cut the stringers to an exact length, or alternatively, to allow the ends of the stringers to project beyond the edges of the slab-forming surfaces in overhanging relationship with respect to the shoring. Insofar as the panels themselves are concerned, it has been the practice to employ filler pieces at the ends of the stringers and these filler pieces must be carefully cut and fitted into place, thus consuming considerable time insofar as labor is concerned and utilizing expendable materials. In order to make up an odd dimension transversely relative to the slab, stringer cross-pieces are usually cut and fitted into place and held in position by special shores or fastened by brackets, braces, struts and the like. In short, the solution of the problem of accommodation of an odd dimension, whether the dimension be transversely of the slab or longitudinally thereof, is usually a matter of expediency and it involves the ingenuity of a carpenter in most instances with no standard practice being available and with only the materials at hand being available for the purpose.

Another and important aspect of the present invention resides in the manner in which the filling-in of odd dimensions, both longitudinal and transverse, may be accomplished without requiring special cutting and fitting operations, the use of special supporting shores, overhanging stringers or stringers which must be cut to dimension, and without the use of expendible materials. Accordingly, the invention contemplates the provision of a novel adjustable stringer which, when an odd dimension in a longitudinal direction is encountered, may be put to use to support a series of fill-in panels which are preferably, but not necessarily, disposed at an end region of the slab. Such adjustable stringers are of a sectional nature and are longitudinally extensible and contractible to the extent necessary to accommodate the supporting of the ends of any filler panels or fill-in pieces which may be used to make up the odd dimension. The adjustable stringers have associated therewith the previously mentioned vertically shiftable support bars and the design of the stringers is such that dual purpose clamping devices serve the function, first, of clamping the stringer sections together in their extended positions of adjustment, and secondly, of clamping the support bars in their raised panel-supporting positions. When released, the clamping devices allow the support bars to move to their lowered positions for panel-releasing purposes, and although the stringer sections are released for potential elongation or contraction of the stringer as a whole, the previously mentioned stringer-to-shore brackets hold the adjustable stringers in place against dislodgment.

Yet another feature of novelty associated with the present system is a means for mounting fill-in lumber in place between adjacent laterally disposed stringers so that odd dimension fill-in panels or other pieces may be supported thereon to complete an odd dimension transversely of a slab. Such a means involves a novel supporting bracket and locking device therefor whereby a filler member may quickly and easily be applied to and its ends supported from a pair of adjacent parallel stringers which previously have been operatively positioned at the upper ends of respective shore members. The supporting bracket is useable at any point along the longitudinal extent of a stringer and it is capable of being easily slid along the stringer to the desired location and then locked permanently in position. The bracket further is so designed that it may readily be removed from its installed position on the stringer, and to facilitate such removal, an impact surface is provided on the bracket whereby the bracket may readily be knocked loose from the stringer and the supporting lumber released for removal. Release of the supporting lumber will, of course, effect release of the fill-in panels for subsequent reuse in the installation without relieving the slab of support in the vicinity of such panels.

A still further feature of the present invention resides in the provision of a novel form of transverse fill-in member, such member being adjustable as to length and being adapted for use in place of cut lumber fill-in pieces. Such a member, being adjustable, is reusable in various situations where odd dimensions must be made up and, furthermore, since the member is capable of being released at a comparatively early time after concrete pouring operations, its availability for reuse in the same installation is highly advantageous.

In order to facilitate use of the transverse adjustable fill-in member briefly described above, a novel form of supporting bracket thereof is employed. Such bracket will enable the fill-in member to be readily installed between adjacent parallel stringers at any region longitudinally therealong and, furthermore, it has associated therewith fastening means including a wedge member for drawing the bracket hard against the stringers upon which the bracket is installed. The bracket and adjustable fill-in member also have associated therewith interengaging locking means for releasably holding the ends of the adjustable fill-in member to the bracket against separation in use. The fill-in member and bracket are so designed as to permit ready release of the fill-in members without necessitating removal, dislodgment or other movement of the stringers so that the latter will at no time relieve the overlying slab of the support which they offer until complete slab stripping operations are in order.

The provision of a system of concrete building erection such as has briefly been outlined above, and of the concrete hardware items associated therewith and likewise mentioned above, represent the principal objects of the present invention.

The provision of a system of this sort wherein substantially all of the principal items of concrete hardware required for any given installation may be prefabricated at the factory and shipped to the scene of operations so that little, if any, makeshift operations in the field are necessary; one wherein such items of concrete hardware are, in the main, capable of being fashioned from standard structural members such as I-beams, channels, angle bars, and the like, and from sheet metal stock, small metal parts, such as rivets, nut and bolt assemblies, etc., with a minimum amount of special machining being required; one which eliminates the use of conventional slab anchor hooks and doweling so that, during panel installation, the panels need not be fitted precisely into their final position in the assembly but may be approximately positioned and subsequently slid conveniently into juxtaposition and contiguity to make up the panel assembly; one wherein once the panels are positioned on the stringers, they are self-locking relative to the latter and remain locked thereto against dislodgment until such time as they are manually lifted from the assembly so that the hazard of falling panels is reduced to a minimum; one which uses component parts which are rugged and durable and which, therefore, will withstand rough usage; one which does not require the use of skilled labor; one which lends itself to a wide range of uses; one which in the erection of a large variety of concrete structures; and one which, otherwise, may be practiced with rapidity and convenience, are further desirable features which have been borne in mind in the production and development of the present invention.

Other objects, advantages and features of novelty, not at this time enumerated, will become more readily apparent as the nature of the invention is better understood.

In the accompanying fifteen sheets of drawings forming a part of this specification, several embodiments of the invention have been shown.

In these drawings:

FIG. 1 is a fragmentary perspective view of a typical concrete installation involving the formation of a horizontally disposed concrete slab and showing the form structure of the present invention operatively positioned preparatory to concrete pouring operations;

FIG. 2 is a top plan view of a similar but slightly different installation which is disposed within the confines of a surrounding concrete beam structure;

FIG. 3 is an enlarged fragmentary side elevational view of certain stringer-to-shore connecting mechanism or shore bracket employed in connection with the present invention, and showing the same operatively applied;

FIG. 4 is a sectional view taken substantially along the line 4—4 of FIG. 3 in the direction indicated by the arrows;

FIG. 5 is a sectional view taken substantially along the line 5—5 of FIG. 3 in the direction indicated by the arrows;

FIG. 6 is a sectional view taken substantially along the line 6—6 of FIG. 3 in the direction indicated by the arrows;

FIG. 7 is a sectional view taken substantially along the line 7—7 of FIG. 3 in the direction indicated by the arrows;

FIG. 8 is an exploded perspective view of the shore bracket of FIG. 3, together with a grout seal employed in connection with the bracket;

FIG. 9 is a fragmentary side elevational view of a series of aligned stringers and showing the same operatively connected to the upper ends of a pair of shores by means of the stringer-to-shore connecting mechanism of FIGS. 3 to 7, inclusive;

FIG. 10 is a top plan view of the structure shown in FIG. 9;

FIG. 11 is an end elevational view of the structure shown in FIG. 9;

FIG. 12 is a fragmentary side elevational view similar to FIG. 9 showing the panels operatively installed in position on the supporting stringers;

FIG. 13 is a fragmentary side elevational view similar to FIGS. 9 and 12 after the concrete slab has been poured and showing certain of the panels released for subsequent removal from the installation;

FIG. 14 is an enlarged fragmentary sectional view, somewhat schematic in its representation, illustrating the manner in which the form panels are removed from the installation;

FIG. 15 is an enlarged sectional view taken substantially along the line 15—15 of FIG. 9 in the direction indicated by the arrows;

FIG. 16 is an enlarged sectional view taken substantially along the line 16—16 of FIG. 9 in the direction indicated by the arrows;

FIG. 17 is a fragmentary exploded top plan view illustrating the manner in which a shore and stringer are operatively assembled upon each other;

FIG. 18 is a perspective view of a nonadjustable stringer employed in connection with the present invention;

FIG. 19 is a side elevational view similar to FIG. 9 showing an adjustable stringer constructed in accordance with the principles of the invention;

FIG. 20 is a top plan view of the structure shown in FIG. 19;

FIG. 21 is an end elevational view of the structure shown in FIG. 19;

FIG. 22 is a fragmentary side elevational view partly in section and similar to FIG. 19 showing the panels operatively installed in position on the supporting stringers;

FIG. 23 is a side elevational view similar to FIG. 22 after the concrete slab has been poured;

FIG. 24 is a sectional view similar to FIG. 14 and schematically illustrating the manner in which the form panels are removed from their installed position between adjacent adjustable stringers;

FIG. 25 is a sectional view taken substantially along the line 25—25 of FIG. 19 in the direction indicated by the arrows;

FIG. 26 is a sectional view taken substantially along the line 26—26 of FIG. 19 in the direction indicated by the arrows;

FIG. 27 is a sectional view taken substantially along the line 27—27 of FIG. 19 in the direction indicated by the arrows;

FIG. 28 is a sectional view taken substantially along the line 28—28 of FIG. 19 in the direction indicated by the arrows;

FIG. 29 is an enlarged sectional view taken substantially along the line 29—29 of FIG. 19 in the direction indicated by the arrows;

FIG. 30 is an enlarged sectional view taken substantially along the line 30—30 of FIG. 19 in the direction indicated by the arrows;

FIG. 31 is a fragmentary vertical sectional view taken through a pair of adjacent stringers in the vicinity of an inter-stringer connection constructed according to the present invention;

FIG. 32 is a top plan view of the structure shown in FIG. 31;

FIG. 33 is an enlarged sectional view taken substantially along the line 33—33 of FIG. 32 in the direction indicated by the arrows;

FIG. 34 is an enlarged sectional view taken substantially along the line 34—34 of FIG. 32 in the direction indicated by the arrows;

FIG. 35 is a fragmentary vertical sectional view similar to FIG. 31 with the concrete poured and immediately prior to panel-removing operations;

FIG. 36 is an enlarged fragmentary end perspective detail view of a safety locking device employed in connection with the present system and showing the same applied to one end of an inter-stringer support member;

FIG. 37 is an enlarged fragmentary side elevational view, schematic in its representation, of a panel-supporting bar and illustrating certain panel-loading and panel-releasing operations which may be conducted according to the present system;

FIG. 38 is a fragmentary side elevational view, partly in section, of a sectional shore employed in connection with the present system;

FIG. 39 is an enlarged sectional view taken substantially along the line 39—39 of FIG. 38 in the direction indicated by the arrows;

FIG. 40 is an enlarged fragmentary perspective view of a portion of the shore shown in FIG. 38;

FIG. 41 is an enlarged sectional view taken transversely through a monolithic concrete beam and slab structure and illustrating the application thereto of shoring, stringers and panels according to the present system;

FIG. 42 is a fragmentary sectional view taken transversely through the adjustable stringer shown in FIG. 24 and showing the same in operative supporting relation relative to a pair of panels with a grout sealing strip in position on the stringer;

FIG. 43 is a perspective view of the grout sealing strip of FIG. 42;

FIG. 44 is a fragmentary sectional view similar to FIG. 41 showing a concrete beam and slab assembly with the various form parts operatively applied thereto;

FIG. 45 is a fragmentary detail side elevational view of a prefabricated make-up piece employed in connection with the present system and showing the same in an operatively installed position;

FIG. 46 is a perspective view of the prefabricated make-up piece shown in FIG. 45;

FIG. 47 is a fragmentary detail view similar to FIG. 45 showing the make-up piece of FIG. 45 put to a different use;

FIG. 48 is a fragmentary side elevational view of a slab-supporting form installation, utilizing an adjustable inter-stringer connection;

FIG. 49 is a sectional view taken substantially along the line 49—49 of FIG. 48 in the direction indicated by the arrows; and FIG. 50 is a sectional view taken substantially along the line 50—50 of FIG. 48 in the direction indicated by the arrows.

In all of the above described views, similar characters of reference are employed to designate similar parts throughout.

*Brief Description*

Referring now to the drawings in detail, and in particular to FIG. 1, there has been disclosed in this view a typical installation involving the supporting surface for a concrete slab such as the slab S shown in FIGS. 13 and 14 resulting from the pouring of concrete on such surface. The entire installation has been designated in its entirety at 10 and it involves a series of vertically disposed shores 12, the upper ends of which serve to support a series of longitudinally extending stringers 14, which, in turn, support a series of transversely disposed form panel units 16, the end edge regions of which are supported by the stringers. The slab S, which does not appear in FIG. 1 but which appears fragmentarily in other views such as FIGS. 13 and 14, for example, may constitute the first poured lowermost slab of a series of superimposed slabs subsequently to be poured in a multi-story building installation, the various slabs forming the basis for the floor and ceiling installations of the building. In such a case, the shores 12 will be set up in the usual manner of shore installation on mud sills or ledges (not shown) which are positioned upon the ground or other supporting foundation surface and which serve to prelocate the vertically disposed shores. If the supporting surface represented by the upper faces of the panels 16 is for the purpose of pouring the concrete to produce one of the upper superimposed slabs, then the ledges will be installed on previously formed slabs. It will be understood that the various shores 12 may be cross-braced in any suitable manner by struts or the like, such cross-bracing being omitted herein since it forms no part of the present invention.

The installation 10 is merely illustrative of a typical installation in which the shores 12 are arranged in four spaced apart, longitudinally extending rows and with the panel units 16 having their own longitudinal direction extending transversely of the installation 10 between the adjacent parallel stringers 14. The panels 16 in the illustrated form are conventional steel ply panel units of the type shown and described in the above-mentioned Patent No. 2,997,769, and no claim is made herein to any novelty associated with the same. These panel units are in the form of shallow rectangular box-like structures of tray-like design. Each unit includes a plywood facing 18 bounded by marginal steel frame members including elongated side members 20 and end members 22. Steel ply panels of this general character are made up in standard sizes, specifically in three, four, six and eight-foot lengths, and in one, one and one-half, two, four, six, eight, ten, twelve, fourteen, sixteen, eighteen, twenty and twenty-four inch widths, any combination of such lengths and widths being available.

For purposes of description herein, both in the specification and claims appended hereto, and in the interests of clarity, the direction of extent of the stringers 14 will be considered to be the longitudinal direction of the slab and of the installation on which it is formed, while the elongated direction of the panels 16, i.e., the direction of their length, will be considered as the transverse direction of the slab and its supporting structure. Directions relative to the slab or supporting structure therefor will be referred to either as longitudinal or transverse, while directions relative to the individual panels 16 will be referred to in terms of the long and short dimensions, respectively, of the panel.

It will be observed that the supporting surface for the slab is made up of two series of full length panels of equal width arranged in contiguity with their long edges abutting one another. On the far side of the installation as viewed in FIG. 1, there is a small odd dimension which has been made up by the use of a series of the panels 16 positioned with their long edge regions resting on the stringers 14 and with their short edges abutting. The odd dimension selected for illustration herein has for convenience been shown as being equal to a panel width, but it will be understood that greater or lesser odd dimensions may be made up by the use of wider or narrower panel units in any of the standard sizes in which the panels are manufactured. If necessary, where fractions of an inch are concerned, pieces of lumber may be cut and fitted as to size so as to serve in place of the prefabricated panel units.

The basic arrangements of parts thus far described, without regard to any specific form of shoring, of stringers or of panel units, is more or less conventional in that in the erection of a building construction involving superimposed slabs, the slab foundation is almost invariably comprised of contiguously arranged panels supported upon stringers which are, in turn, supported upon shoring, the general arrangement and disposition being substantially the same as that illustrated in FIG. 1. It is to be noted, however, that, as will be described in greater detail presently, the upper concrete-receiving faces of the plywood facings 18 of the various panel units 16 lie substantially flush with the upper edge faces of the stringers 14 so that these upper edge surfaces of the stringers constitute a limited portion of the slab-supporting surface as a whole. In other words, the ends of the panels 16 do not rest directly upon the upper edges of the stringers as in conventional installations, but lie flush with these surfaces so that adjacent ends of the panels are separated from each other by an intervening portion of a stringer 14. As will become clear presently, the end regions of the various panels 16 are supported upon vertically shiftable rails or support bars 24 which are movably mounted on the sides of the stringers and which may be locked in raised positions so that the panel facings lie flush with the upper edges of the stringers. The support bars 24 are capable of being released or lowered, in which case the panels are free to be withdrawn from the underneath side of the hardened slab, while the stringers remain in their supporting relationship with respect to the portions of the slab which they underlie. Therein lies one of the principal features of the present system.

Still referring to FIG. 1, at the upper end of each shore 12, a shore-to-stringer connection in the form of a bracket 30, hereinafter referred to simply as the shore bracket, serves to maintain the adjacent ends of a pair of aligned stringers 14 in supported relationship with respect to the shoe. The nature and specific function of the various shore brackets 30 will be described in greater detail subsequently, but for the present it is deemed sufficient to state that these shore brackets enable adjustment of the panels for grade by permitting elongation or shortening of the shores 12, either from above the slab-supporting surface offered by the panels, or from below the same after the panels are in place. This dual adjustment feature constitutes another important feature of the present invention.

The shore members 12 themselves are capable of both a fine and a coarse adjustment for length. As will be described subsequently in connection with FIGS. 38, 39 and 40, each shore is made up of telescopic tubular sections so that it is possible to select the proper shore sections to build up a given shore of approximately the correct length for the proper elevation of a horizontal panel structure and, after the various shores have been thus set up or erected, the stringers positioned thereon, and the panel's operatively applied to the stringers, a final shore adjustment may be made either from above or below the panel level to secure the desired grade so that the tops of the shores will have the proper elevation for a horizontal slab structure.

It frequently happens that it is necessary to make up an odd dimension in a longitudinal direction relative to the slab and one exemplary method of doing this has been shown in FIG. 2. The installation of FIG. 2 is similar in many respects to the installation shown in FIG. 1. The installation, however, is made within the rectangular confines of a preformed concrete beam structure 32 and the odd dimension in a longitudinal direction relative to the slab is made up by the use of a pair of narrow filler channels 34, each of which lies within a longitudinally extending row of the panels 16 and also by a judicious selection of panel sizes in the row of panels at the left-hand side of FIG. 2 where an odd dimension transversely of the slab is accommodated in a manner similar to that disclosed in connection with FIG. 1. It is to be noted that the odd dimension which occasioned the use of the filler panels 34 necessitates the use of a relatively narrow filler panel 36 in the left-hand row of filler panels shown in this view.

The stringers 14 in FIG. 1 are made up in standard lengths and, therefore, the odd dimension represented by the filler panels 34 cannot be accommodated by the fixed length stringers 14. According to the present system, this odd dimension in a longitudinal direction may be accommodated by the use of adjustable length stringers such as have been shown in detail at 40 in FIGS. 19 to 23, inclusive. A detailed description of these adjustable length stringers will be made presently. Near the upper left-hand corner of FIG. 2, a panel-supporting inter-stringer connection 42, which has been shown in detail in FIGS. 31 to 36, inclusive, is employed for supporting an end of the rearmost panel 16 in the odd dimension row of panels. As is the case in connection with the fixed length stringers 14 previously mentioned, the adjustable length stringers 40 have associated therewith vertically movable support bars 44, as shown in FIG. 19, similar to the support bars 24 and similarly operable to effect release of the various panels 16, 34, 36 or any other fill-in pieces and the like which may be employed, in making up a slab-supporting surface.

Although only two exemplary installations capable of being effected according to the present system have been illustrated herein in FIGS. 1 and 2, respectively, it will be understood that a wide variety of other installations may be accommodated by the present system and utilizing the concrete hardware briefly described above. The essential features of the system are, in the main, illustrated in FIGS. 1 and 2, but many details which are obscured in these views appear elsewhere in the drawings and will be described subsequently. Furthermore, other adaptations and modifications, not present in FIGS. 1 and 2, will be discussed and where illustrated, will be described.

*The Shoring*

The details of the shoring associated with the installations of FIGS. 1 and 2 are best illustrated in FIGS. 3 to 8, inclusive, and 38 to 40, inclusive. The previously mentioned shore bracket 30 is adapted to be permanently installed on the upper end of the shore 12 and to remain permanently thereon. Thus, this shore bracket, in effect, constitutes a functional part of the shore and throughout this specification and in the claims, it will be treated as an element of the shore assembly. However, to facilitate description thereof, it will be described under a separate heading. The details of the shore assembly which are illustrated in FIGS. 3 to 8, inclusive, are such details as relate to the shore bracket 30, while in FIGS. 38, 39 and 40, the details of the body portion of the shore are illustrated.

Referring now to FIGS. 38, 39 and 40, each shore 12 is in the form of a composite post which is made up of tubular sections of cylindrical tube stock, the shore shown in FIG. 38 being comprised of four such sections including a lower fixed section 50, a next adjacent fixed section 52, a third fixed section 54 immediately above the section 52, and an upper rotatable section 56. The lower section 50 is provided with a suitable foot piece 58 and the upper end of this section is provided with a small hole 60 (FIG. 40) designed for registry with a slot 62 provided in a short pilot section 64 which is telescopically received within the lower end of the section 52 and welded therein as at 66. The pilot section 64 is receivable within the upper open end of the shore section 50 to the extent that the lower rim 68 of the section 52 abuts the upper rim 70 of the section 50, at which time the hole 60 and slot 62 may be moved into register and a fast pin 72 passed through the hole and slot to lock the two sections together. A similar connection between the sections 52 and 54 involving a pilot section 64 and fast pin 72 is provided. From the above description, it will be seen, therefore, that the entire sections 50, 52 and 54, when assembled upon one another and secured in position by the fast pins 72, are relatively fixed. The section 56 is of apron-like design and it is both rotatable and telescopically movable axially relative to the shore section 54.

As best seen in FIG. 4, the upper end of the shore section 54 is provided with an end closure plate 80 in the form of a ring having a central opening 82 therethrough and through which there is adapted to project a vertically disposed elevation screw 84. The elevation screw 84 is threadedly received through a nut 86 welded as at 88 to the upper face of the plate 80. The upper end of the shore section 56 is provided with a closure plate 90 similar to the plate 80 and having a central opening 92 therethrough through which the shank portion 94 of the elevation screw 84 projects. A nut 96 is welded as at 98 to the plate 90 and as at 100 to the elevation screw 84 so that, upon turning of the upper section 56, the nut 96, plate 90 and elevation screw 84, together with the section 56, will turn bodily as a unit, thus feeding the adjusting screw through the nut 82 in one direction or the other, depending upon the direction of rotation of the section 56, to effect a relatively fine adjustment of the elevation of the section 56. The depending portion of the upper section constitutes an apron which closely hugs the outer cylindrical surface of the section 54 and lends reinforcement to the elevation screw 84.

As shown in FIGS. 4, 39 and 40, each of the sections 50, 52 and 54 has disposed within, and completely filling the same, a mass of reinforcing material 102 which possesses an appreciable degree of resistance to compressional force. While various materials are suitable as a filler material for these sections, the material employed is preferably a commercially available cellular material containing occluded air cells and commonly referred to as "Plastic Foam." Various grades of such a material are manufactured and sold by the Glidden Paint Company of Cleveland, Ohio, under the trade name of "Glidfoam," the particular grade of which employed herein offers an appreciable degree of resistance to compressional forces, but which, nevertheless, is somewhat resilient. Such a material is widely sold for ice box insulation purposes. It has been described in greater detail and its physical properties set forth in a co-pending application of George F. Bowden, Serial No. 49,672, filed on August 15, 1960, and entitled "Concrete Wall Form Panel Unit With Reinforcing and Insulating Means." This filler material, when in position within the sections, rigidifies the shore as a whole and inhibits the tendency of the same to become indented or warped when bending stresses are applied to the shore. As shown in FIG. 39, the filler material is recessed as at 104 to accommodate the fast pins 72 and, as shown in FIG. 4, a relatively deep socket 106 is formed in the material 102 in register with the opening 82 in the plate 80 to accommodate reception of the lower end of the threaded portion of the elevation screw 84.

The sleeve-like upper section 56 is provided with a series of spanner holes 108 therein near the upper end of the section designed for cooperation with the spanner wrench so that the sleeve-like shore section 56 may be turned relative to the other shore sections. Turning of the section 56 will effect turning movement of the fixed nut 96 and elevation screw 84 as a whole to vary the elevation of the section 56 relative to the section 54 and thus elongate or shorten the over-all extent of the shore 12. The upper end of the elevation screw 94 is squared as at 110 to accommodate reception thereover of a torque wrench. The spanner holes 108 make it possible for the height of the shore to be adjusted from beneath the positioned panels 16 while the wrench-receiving portion 100 of the elevation screw permit such adjustment from above the panels 16 all in a manner and for a purpose that will be made clear presently.

*The Shore Bracket*

The shore bracket 30 of the present invention has been illustrated in detail per se in FIGS. 8 and 17 and it is shown in selected environments in FIGS. 3 to 7, inclusive, 9 to 13, inclusive, 29, 30, and elsewhere in the drawings. It will be described specifically in connection with FIGS. 3 to 8, inclusive, and 17. Referring now to these views in detail, and specifically to FIGS. 8 and 17, the shore bracket 30 involves in its general organization an open-ended tubular body member 120, the lower open end of which is seated within the confines of a short section of channel stock 122. The tubular body 120 and channel piece 122 constitute the two principal parts of the bracket assembly 30. The channel sides 124 straddle the lower end of the tubular body 120 and the medial regions of the sides are pressed inwardly as at 126 and are welded as at 128 to the opposite sides of the tubular member 120. The lower open end of the body 120 seats squarely on the channel bottom or base 130 and a hole 132 is formed in the channel bottom 130 in register with the longitudinal axis of the tubular member 120, this hole serving as a clearance for the elevation screw 84 when the bracket is assembled at the top of a shore member as shown in FIGS. 4 and 5. The channel bottom 130 has associated therewith a pair of rivets 135 the head portions of which underlie the channel bottom and are welded thereto, and the shank portions of which project upwardly through the channel bottom, as best seen in FIGS. 8 and 17, these upwardly projecting portions of the rivets serving as locating pilot pins for attachment of a pair of the longitudinally extending stringers 14 in a manner that will become apparent after the nature of the stringers themselves is better understood. The front and rear sides of the tubular body 120 have welded thereto pairs of small angle pieces 134, with the pieces of each pair being arranged in spaced relationship to define therebetween a stringer-receiving slot 137, the function of which will be apparent when the nature of the stringer 14 has been set forth.

The tubular body portion 120 of the shore bracket 30 is provided with a pair of spaced aligned holes 136 (FIG. 8) on opposite sides thereof to facilitate insertion of a taper pin or the like 138 (FIG. 4) through the elevation screw 84. The longitudinal extent of the taper pin 138 is greater than the diameter of the hole 92 in the cap portion 90 of the short section 56 so that when the taper pin is in position on the elevation screw 84, the shore bracket 30 is loosely held to the section 56 against removal. A grout seal 139 in the form of a closure cap of rubber or other elastomeric material is provided with a spring clip 141 by means of which the seal may be maintained in position over the upper open end of the tubular body portion 120 of the shore bracket 30 during concrete pouring operations.

*The Nonadjustable Stringer*

One of the nonadjustable stringers 14 is shown in detail in FIG. 18. Such a stringer is shown in various environmental arrangements in FIGS. 3 to 7, inclusive, FIGS. 9 to 11, inclusive, and elsewhere in the drawings. Referring specifically to FIG. 18 wherein the perspective view reveals most of the details of the stringer 14, the stringer includes a body portion in the form of an I-beam having upper and lower horizontal flanges 140 and 142, respectively, and an interconnecting vertical web 144. The web 144 is provided with a series of arcuate slots 146 therein at spaced regions longitudinally of the I-beam. On opposite sides of the web 144, in straddling relationship with respect to the latter, are a pair of the previously mentioned movable support bars 24. Each support bar 24 is in the form of an angle piece having a horizontal flange 148 which projects outwardly beyond the lateral extent of the I-beam flanges 140 and 142, and a vertical flange 150. The vertical flange 150 is provided with a series of spaced holes 152 therethrough (FIGS. 14 and 16), each hole being designed for register with one of the slots 146. A series of clamping nut and bolt assemblies 154 pass through the registering holes 152 and slots 146 and are provided for the purpose of clamping the support bars hard against the sides of the web 144 in either an elevated operative panel-supporting position or in a lowered panel-releasing position. The various arcuate slots 146 are so formed in the web 144 of the I-beam that they afford an upgrade rise along which the various clamping nut and bolt assemblies may be slid to carry the support bar between its upper and its lower positions.

Near the opposite ends of the stringer 14, the lower horizontal flange 142 is provided with a pair of holes 160 (FIGS. 17 and 18), the holes of each pair being disposed on the opposite sides of the web 144. These holes 160 are adapted to receive therein the upwardly extending shank portions of the rivets 135 as shown in FIGS. 3, 5 and 6 to lock the ends of the stringers in a supported position on the shore bracket 30. These rivets and holes serve to maintain adjacent ends of adjacent stringers in longitudinal alignment as shown in FIGS. 5 and 6. With each end of the stringer thus supported upon the base part 130 of a bracket 30, the web 144 of the stringer is confined within the slots 137 between adjacent pairs of angle pieces 134 to stabilize the stringer and prevent angular tilting thereof.

It is to be observed that with a given stringer 14 operatively supported at its ends on respective shore brackets 30, and with the latter operatively positioned on the upper ends of respective shores, and furthermore, with the nut and bolt assemblies 154 disposed within their respective slots 146 at the extreme upper ends of the slots as shown in FIGS. 12 and 13, and as schematically shown in full lines in FIG. 37, the upper edges of the various panels 16 will lie flush against the top flange 140 of the stringer. Stated otherwise, with the support bar 24 in its upper position, the distance between the horizontal flange 148 of the support bar 24 and the upper horizontal top flange 140 of the stringer 14 is equal to the over-all thickness of one of the panels 16 so that with the panel resting upon the horizontal flange 148, its upper edge surface will lie flush with the upper face of the top flange 140. As also shown in FIG. 13, and as schematically shown in FIG. 37, when the nut and bolt assemblies 154 are disposed in their lowermost positions within the slots 14 at the left-hand end thereof, as viewed in FIG. 37, the entire support bar 24 will be lowered bodily to such an extent that its horizontal flange 148 will be spaced below the top flange 140 of the stringer 14 an appreciable distance so that the panels 16 supported upon the flange 148 will be released by virtue of the clearance, which has been designated at 162 in FIG. 13, for subsequent removal by the manipulative procedure schematically illustrated in FIG. 14, and which will be described presently.

As seen in FIGS. 12 to 18, inclusive, the horizontal flange 148 of the support bar 24 is provided with a series of longitudinally spaced and aligned upstanding protuberances 164. These protuberances are of small height and they are spaced outwardly from the web 144 a sufficient distance that when the end regions of the various panels 16 are supported upon the support bar 24, the lower edges of the steel end members 22 of each panel 16 will seat upon the flange 148 and lie behind the protuberances 164 to prevent endwise shifting movement of the panel when a support bar 24 is in its lowered or upper position. These protuberances 164 are provided as a precautionary safety measure to prevent accidental dislodgment of panels when the support bars are in their lowered or upper positions since at this time, as clearly shown in FIG. 14, the distance between the webs 144 of adjacent parallel stringers 14 is greater than the over-all length of a panel, the excess distance being sufficiently great as to permit dropping of a panel under certain circumstances. The protuberances 164 also serve to center the panels between the two webs so that when the support bars 24 are raised with the panels resting thereon, the latter will move vertically into contiguity with the top flanges 140 of adjacent stringers.

Panel removal operations may best be described in connection with FIG. 14 wherein the support bars 24 are shown as being in their lowered positions, i.e., down. In the down position of the support bars, due to the clearance 162 afforded between the panel facing 18 and the underneath surface 166 of the previously poured concrete slab S, the panels 16 are free to the extent that they may be shifted endwise in either direction preparatory to removal operations. When the support bars 24 are in their raised positions, i.e., up, the panels 16 are compressed between the slab S and the horizontal flanges 148 of the support bars 24. They are also confined between the top flanges 140 of adjacent longitudinally extending stringers 12 so that the panels are securely locked against dislodgment in any direction.

With the various support bars 24 down, as shown in FIG. 14, in order to remove a panel, it is merely necessary to shift the panel endwise from its centered position shown in full lines in this view to the dotted line position thereof wherein one end of the panel abuts against one of the webs 144 of the two stringers between which the panel is positioned. To thus move the panel, it is necessary to elevate the opposite end thereof slightly so that it will clear the protuberances 164. In the dotted line position of the panel 16, the right-hand end of the panel, as viewed in FIG. 14, lies to the left of the vertical plane of the adjacent free edge of the horizontal flange 148 so that by lowering the right-hand edge of the panel to the broken line position illustrated in this view, this end of the panel will clear such edge and the panel may be pulled out from beneath the slab S.

During such panel-removing operations, the stringers 14 remain in their supporting position relative to the slab with the latter resting upon the top flanges 140 thereof so that at no time is the supporting pressure on the slab relieved except in the limited area where the panels are removed. Because of this fact, it is possible to resort to panel-removal operations at a comparatively early date after concrete pouring operations have been effected since it is not necessary to wait until the concrete has attained sufficient strength to be self-supporting between stringers twice removed from one another.

Mechanical means are provided for manually effecting movement of the various support bars 24 between their raised and lowered positions. Accordingly, as best seen in FIGS. 12, 13 and 15, each stringer 14 has welded or otherwise secured thereto in the medial regions thereof, and adjacent the bottom flange 142, an angle piece 170 provided with a hole 172 therein designed for reception therethrough of the fulcrum pin 174 of a tool 176 including an operating bar 178. The bar 178 carries a second pin 180 which is spaced from the fulcrum pin 174 and which is designed for reception in a hole 182 provided in a second angle piece 184 secured in any suitable manner as by welding to the vertical flange 150 of the support bar 24 in the medial regions thereof. As shown in FIG. 15, by inserting the fulcrum pin 174 in the hole 172 and the operating pin 180 in the hole 182, the operating bar 178 may be swung in one direction or the other to apply force to the support bar 24 and shift the same between its two extreme positions. The support bar may be secured or clamped in its raised position by tightening the nut and bolt assemblies 154.

*The Adjustable Stringer*

Referring again to FIG. 2, it has been previously set forth how in certain instances it is necessary to make up an odd dimension longitudinally of the slab S and this may be accomplished by the judicious selection of filler panels, such as the panels 34, whose short dimensions are commensurate with the odd dimension to be made up. It is obvious that when an odd dimension of this sort creates a problem, it is necessary to lend support to the opposite ends of all of the panels in the various rows of panels extending longitudinally of the slab. In other words, the ends of each panel must find support upon the stringers and since the stringers 14 are made in standard lengths, the odd dimension must be made up not only by the use of filler panels such as the panels 34, but by additional stringer supporting areas to accommodate the filler panels. Accordingly, the adjustable stringer illustrated in FIGS. 19 to 28, inclusive, and elsewhere in the drawings has been devised. Each adjustable stringer 40 is in the form of a composite sectional I-beam and it involves in its general organization an assembly of parts which cooperate to make up a composite medial body section 200 from which there is longitudinally extensible at the ends thereof a pair of end sections 202, the two end sections being substantially identical so that a description of one of them will suffice for the other. The medial body section 200 is comprised of a short length 204 of I-beam stock having a top flange 206, a bottom flange 208, and an interconnecting web 210. Welded as at 212 (FIG. 19) to the web 210 are a pair of channel sections 214 and 216, respectively, each having top and bottom channel side flanges 218 and 219, respectively, and a channel web 220. The channels 214 and 216 are coextensive with each other and they extend outwardly beyond the ends of the I-beam section 204 an appreciable distance, as shown in FIGS. 19 and 20, and define therebetween on opposite sides of the I-beam section, a narrow slot 222 (FIG. 26), within which slot there is longitudinally slidable and adjustable one of the end sections 202.

Each end section 202 is in the form of a length of I-beam stock having an upper horizontal flange 224, a lower horizontal flange 226, and an interconnecting web 228. The web 228 is slidably received within the slot 222 and the bottom flange 226 extends outwardly in opposite directions and underlies the two bottom flanges 219 of the channel sections 214 and 216, as shown in FIG. 25. While, similarly, the top flange 224 of the I-beam 202 extends outwardly in opposite directions and overlies the two top flanges 218 of the channel sections 214 and 216. To retain the two end sections 202 in their assembled position upon the medial composite section 200, the web 228 of each end section 202 is provided with a longitudinally extending elongated slot 230 therein (FIG. 19), this slot being designed for registry with a hole 232 provided in the web 228. A nut and bolt assembly 234 extends through the slot 230 and hole 232 and, when this nut and bolt assembly is tightened, it serves to draw the two channel bases 220 together to securely clamp the web 228 therebetween and thus clamp the end section 202 as a whole in any desired position of longitudinal adjustment relative to the composite medial section 200. A second longitudinally extending elongated slot 236 is formed in the web 228 and is spaced from the slot 230. The slot 236 is aligned with the 230 and it is designed for the same purpose, i.e., registry with the hole 232. These slots 230 and 236 may be selectively employed for registry with the hole 232 to effect a basic coarse adjustment of the over-all extent of the adjustable stringer 40, while the clamping nut and bolt assembly 234 is employed for effecting a fine adjustment of the parts. By utilizing various combinations of the slots 230 and 236, it is obvious that four ranges of adjustment as to stringer length may be effected, the shortest range being in effect when both slots 236 are employed and the longest range being in effect when both slots 230 are employed. The vertically movable support bars 44 associated with the adjustable stringer 40 are similar in design to the vertically movable support bars 24 associated with the nonadjustable stringer 14 and they are substantially identical in their function. As best seen in FIGS. 19 and 20, each support bar 44 is in the form of a length of angle stock having a vertical flange 240 and a horizontal flange 242. The horizontal flange 242 is provided with a series of longitudinally spaced and aligned upwardly projecting protuberances 244 similar to the protuberances 164 and designed for the same purpose, namely, to center the various panels 16 in position between adjacent spaced longitudinally extending stringers 40. The vertical flange 240 of each support bar 44 is formed with a series of longitudinally spaced arcuate slots 246 similar in function to the slots 146 associated with the support bars 24, but reversed as to their direction of curvature. The two support bars 44 are disposed on opposite sides of the composite middle section 200 and the various nut and bolt assemblies 234 pass through respective slots 246 so that when these nut and bolt assemblies are tightened, the support bars 44 are drawn hard against the sides of the stringer body in clamping relationship. The nut and bolt assemblies 234 thus serve the dual function, first, of clamping the various sections 200, 202 of the stringer in positions of longitudinal adjustment, and secondly, of clamping the support bars 44 in their raised operative panel-supporting positions.

The outer or free ends of the stringer sections 202 are designed for cooperation with the shore brackets 30 in a manner substantially identical with the cooperation between the ends of the stringers 14 and these shore brackets so that it is deemed unnecessary to enter into a detailed description of the stringer-to-shore connection. The connections at opposite ends of the stringer serve to maintain the stringer securely supported on the two shore brackets 30 even when the clamping nut and bolt assemblies 234 are loosened for support bar-dropping operations.

As shown in FIG. 19, the ends of the support bar 44 terminate short of the ends of the two channel sections 214 and 216, respectively, so that it is necessary to support the ends of any panel units 16 which may overhang these support bars. Accordingly, a small angle support 250 is provided on opposite sides of the web 228 and it has associated therewith a pair of nut and bolt assemblies 252 which pass through angle slots 254 formed in the web 228. The nut and bolt assemblies 252 are slidable in the slots 254 between raised and lowered positions corresponding to the raised and lowered positions of the support bars 44. When the angle support 250 is in its raised position, as shown in FIG. 19, the upper edge thereof is flush with the flange 42 of the support bar so that a panel may bridge the distance between the adjacent end of the support bar and the angle support 250 to thus securely support the panel in its operative relationship relative to the remaining panels in the series.

As a safety measure, a fast pin 256 is adapted to be passed through registering holes in the support bars 44 and in the channel bases 220 of the two channel sections 214 and 216 to maintain the support bar in its raised position. After loosening of the nut and bolt assemblies 234, it is necessary to remove the fast pin 256 before the support bars 44 can be lowered.

In order to facilitate movement of the support bar 44 between its raised and lowered positions, an angle piece 260 similar to the previously described angle piece 170 is provided with a hole 262 designed for cooperation with the fulcrum pin 174 (FIG. 15) of the tool 176. The operating pin 180 of the tool is designed for selective cooperation with the opposite sides of a flange piece or shoulder-forming abutment 264 welded or otherwise secured to the vertical flange 240 of the support bar 44. When the support bar as a whole is urged in one direction, for example, to the left, as viewed in FIG. 19, the arcuate slots 246, cooperating with the nut and bolt assemblies 234, will cause the support bar to be lowered. When the support bar is urged in the opposite direction, i.e., to the right, the cooperation between the arcuate slots and the nut and bolt assemblies will cause the support bar to be elevated.

The manner of removing the panels 16 from between adjacent nonadjustable stringers 14 and from beneath the concrete slab S has been illustrated in FIG. 24. The procedure followed is substantially the same as that followed in connection with the removal of panels from the nonadjustable stringers 14, as illustrated in FIG. 14. After the nut and bolt assemblies 234 have been loosened and the fast pin 256 withdrawn from its locking position, the support bars 44 are moved to their lowered positions, as shown in FIG. 24. The various panels 16 will, if properly lubricated, move downwardly with the support bars 44 and assume the full line position illustrated. The panels are thus free to the extent that they may be shifted endwise in either direction preparatory to removal operations. With the support bars 44 down, in order to remove the panel, it is merely necessary to shift the same endwise from its centered position to the dotted line position thereof wherein one end of the panel abuts against the channel member 216. Before the panel 16 can be moved to its dotted line position, it is necessary to elevate the opposite end thereof slightly so that it will clear the protuberances 244. In the dotted line position of the panel 16, the right-hand end of the same, as viewed in FIG. 24, lies to the left of the vertical plane of the adjacent free edge of the horizontal flange 242 so that by lowering the right-hand edge of the panel to the broken line position illustrated in this view, this end of the panel will clear such edge and the panel may be pulled out from beneath the slab S. As is the case in connection with the nonadjustable stringers 14, so in the present instance during panel removing operations, the stringers 40 remain in their supporting position relative to the slab S with the latter resting upon the top flanges 206 of the I-beam section 204, and also upon the top flanges 224 of the end sections 202 so that at no time is the supporting pressure upon the slab relieved except in the limited area where the panels are removed.

Referring now to FIG. 19, it will be seen that the two top flanges 224 of the end sections 202 of the adjustable stringer 40 overlie the oppositely directed top channel flanges 218 of the channel members 214 and 216 so that the planar continuity of the upper surface of the adjustable stringer as a whole is interrupted by the lower elevation of the top channel flanges 218. In order to restore this continuity and also to seal the slot 222 (FIG. 26) against the entrance of grout, a rubber or other elastomeric sealing strip 270 such as has been shown in detail in FIG. 43 has a rib portion 272 which may be pressed into the slot 222 and a flat overlying portion 274 which rests upon the top channel sides 218. The sealing strip 270 may be manufactured as an elongated strip of stock material capable of being cut to length to accommodate the various adjustments of the adjustable stringers 40 in the field.

*Special Considerations—Transverse Odd Dimension Make-Up Operations with Fitted Supports*

As previously indicated, it frequently happens that, as shown at the left-hand sides of either FIGS. 1 or 2, it is necessary to make up an odd dimension that cannot be accommodated by the use of commercial steel ply panels of standard length. In such instances, where the odd dimension to be made up will permit of it, standard steel ply panels may be selected as to their width instead of as to their length and positioned between and supported upon nonadjustable stringers 14 (if there is no longitudinal odd dimension to be accounted for) or between adjustable stringers (if there is such a longitudinal odd dimension). The disclosure of FIG. 31 is predicated upon the existence of only a transverse odd dimension, with such odd dimension being made up by two of the panels 16, placed longitudinally, and a narrow filler channel 34. The ends of adjacent panels, as well as of the filler channel 34, are adapted to be supported upon the previously mentioned wooden inter-stringer connecting members 42 (see also FIGS. 32 to 36, inclusive). These connecting members are in the form of pieces of lumber, the ends of which are supported in bracket assemblies 300 which, in turn, are supported in transverse alignment from the bottom flanges 142 of the stringers 14. Each bracket 300 is of three-piece sheet metal construction and it includes a body portion which is generally U-shape in transverse cross section so as to present a base plate 302 which closely underlies the wooden inter-stringer support 42 at one end thereof, and a pair of upstanding side wings 304 which straddle the support 42 on opposite sides thereof in cradle-like fashion. Each side wing 304 is provided with a hole for reception therein of a dual-headed nail 306 by means of which the side wing may be secured to the wooden support 42, as best seen in FIG. 36. The two side wings 304 and the base plate 302 project forwardly of the end face 307 of the inter-stringer connecting member 42 so as to overhang this end face, and the side wings 304 are undercut so that each wing, in combination with the overhanging portion of the base plate 302, defines a flange-receiving slot 310 for reception therein of the bottom flange 142 of the adjacent stringer 14, as shown in FIGS. 31 and 35. When the bracket 300 is mounted on the bottom flange 142 of the stringer with this flange projecting into the slot 310, the end face 307 of the wooden support 42 terminates in a vertical plane sufficiently removed from the web 144 of the stringer 14 as to permit dropping of this end of the support when the bracket 300 is removed therefrom.

The distal end of the bottom plate 302 is turned downwardly as at 312 so as to provide an impact flange which is adatped to be struck by an impact tool, such as a hammer or the like, for the purpose of shifting the entire bracket assembly 300 in a direction to withdraw the slots 310 from the flange 142 after the nails 306 have been extracted from the support 42 to release the bracket assembly 300.

The bracket assembly 300 has associated therewith a locking device in the form of a latch plate 320. The latch plate 320 is comprised of a flat section of sheet metal stock which is apertured to receive therethrough a rivet-like pivot pin 322 which is adapted to pass through both the latch plate and one of the side wings 304, thus pivoting the latch plate for swinging movement in a vertical plane about the axis of the pin 322. The forward region of the latch plate is provided with a relatively wide notch 324 therein, thus providing an upwardly projecting latch dog 326 at the extreme distal end of the latch plate. The latch plate is movable from the lowered position wherein it is shown in FIG. 35 to the elevated position wherein it is shown in FIG. 31 so that the bottom region of the stringer 14 will seat within the slot 324 with the latch dog 326 moving behind the remote edge of the stringer flange 142 to lock the supporting bracket 300 as a whole against withdrawal from the flange 142. When in this locked position, a nail 328 is adapted to be passed through registering holes 330 and 332 (FIG. 35) provided in the wing 304 and latch plate 320, respectively, to maintain the latch plate in its stringer-engaging position.

With the wooden panel-support 42 securely in position as shown in FIG. 31, and with the supporting bracket assemblies 300 locked, as previously described, the adjacent ends of a pair of contiguous panels will rest upon the support 42 while the side members 20 of the panels will rest upon the angular support bars 24 with their lower edges falling behind the protuberances 164 so that the filler panels 16 will be placed between the two stringers 14 with the support bars 24 in their raised positions locked in position by the brackets 300.

In order to release the filler panels 16 for subsequent use at an early date, it is merely necessary to withdraw the dual-headed nails 306 from the support 42, as well as the locking nails 328, whereupon the body of the bracket assembly will be freed for subsequent withdrawal from the flange 142 by the application of an impact tool to the impact flange 312. After both bracket assemblies 300 have been removed from the opposite ends of the support 42, this support 42 is capable of being moved downwardly from between the stringers 14 for removal purposes.

From the above description, it will be seen that the bracket assembly 300 is capable of being quickly and easily applied in position between two adjacent longitudinally extending stringers 14 for panel-supporting purposes, and it is also capable of being quickly removed. In the installation of the inter-stringer supports 42, after the brackets 300 have been nailed thereto, as previously described, and the flanges 142 of the stringers engaged in the slots 310, the inter-stringer support 42 may be slid longitudinally of the installation in one direction or the other prior to movement of the latch bar to its locking position. The inter-stringer support 42 may be brought to its final position with a fair degree of accuracy by merely sliding the same to its approximate position and then tapping one end or the other with an impact tool, such as a hammer, until the support is brought precisely into place where the end regions of adjacent panels will rest thereon with their line of contact being substantially centered upon the support 42.

*Transverse Odd Dimension Make-Up Operations With Adjustable Supports*

According to the present system, it is possible to make up an odd dimension in a transverse direction relative to the slab S by employing one of the adjustable stringers 40 instead of the wooden supports 42, as shown in FIGS. 31 to 35, inclusive. The installation shown in FIG. 48 differs but slightly from the installation shown in FIG. 31 insofar as the supporting shores 12, shore brackets 30, longitudinal stringers 14, their support bars 24, and the panels 16 are concerned. Thus, to avoid needles repetition of description, corresponding reference numerals have been applied to the substantially identical parts. Similarly, the adjustable support member 400 shown in FIG. 48, which is employed as a transverse panel-support in this installation, is substantially the same as the stringer 40 described in connection with FIGS. 19 to 21, inclusive, so that the application of corresponding reference numerals to the parts thereof shown in FIGS. 48 to 50, inclusive, will, to a large extent, suffice for descriptive purposes.

In order that the opposite ends of the adjustable support 400 may be supported from the longitudinally extending stringers 14, special supporting bracket assemblies 401 are provided and these assemblies are attachable to the bottom flanges 142 of the stringers 14. The bracket assembly 401 is comprised of three principal parts, including a central body part 402 and a pair of side wings 404 which may be riveted as at 406 or otherwise secured to the body part 402. The body part 402 is of U-shape configuration in transverse cross section, as best seen in FIG. 49, and includes a horizontal base 408 and downwardly projecting sides 410, the side wings 404 being secured to these latter sides. The side wings 404 project upwardly above the base so that the entire structure, in transverse cross section, assumes the configuration of the letter H. The side wings 404 are slotted as at 412 immediately above the plane of the base 408 for reception of the bottom flange 142 of the stringer 14. The metal of each side wing 404 above the base 408 is relieved to produce a pair of end edges 414 adapted to abut against the web part 144 of the stringer 14 when the bracket is in position on the latter. Rivets 416 similar to the rivets 135, and designed for a similar purpose, have their shank portions projecting upwardly from the base 408 and are adapted to be received through the holes 160 which are provided in the end sections 202 of the adjustable support member 400.

The base 408 is formed with an elongated longitudinally extending slot 420 therein near the rear edge thereof. This slot is adapted to project beyond the overlying bottom flange 142 of the stringer 14 when the bracket 401 is in position thereof so that a wedge 422 may be driven into the slot to clamp the edges 414 of the side wings 404 hard against the web 144 of the stringer 14.

Near the ends of the adjustable support 400, the web portions 228 of the end sections 202 are provided with vertically adjustable angle supports 250 as previously described in connection with the adjustable stringers 40. These angle supports 250 serve to support the metal frame bars 22 of the panels 16 which are employed for making up the odd dimension.

From the above description, it will be seen that the wedge 422, when in position within the slot 420, serves to maintain the bracket 401 as a whole against lateral shifting relative to the stringer 14 upon which it is mounted. The solts 412, therefore, are prevented from moving away from the bottom flange 142. However, when the wedge is removed from the slot 420, the adjacent end of the adjustable support 400 may be slid longitudinally along the bottom flange 142 until the bracket 401 clears the latter, after which the bracket may be removed from the adjustable support 400 by lifting the same away from the rivets 416, after which the adjustable support as a whole may be withdrawn.

Removal of the adjustable support 400 from beneath the slab S may be followed by a lowering of the support bars 44 associated with the longitudinally extending stringers 14 and a subsequent removal of the panels 16 in the manner previously described. It is to be noted that the panel support-removing operations described above requires no release of pressure on the underneath side of the concrete slab S inasmuch as the only operation performed upon the stringers 14 is the lowering of the support bars 44 thereon.

*Monolithic Concrete Pouring Operations*

In FIG. 41 a concrete form is disclosed wherein a monolithic structure, such as an integral beam and slab combination SB, may be poured. The slab part S' of the monolithic structure is supported by means of shore assemblies 12 having shore brackets 30 installed on their upper ends, as preivously described, and by stringers 14 when there is no odd dimension in a longitudinal direction to be considered. If there is such an odd dimension, it will be understood that these stringers 14 will be supplanted by adjustable stringers 40. In FIG. 41, many of the component articles of hardware, the nature and function of which have previously been set forth above, are employed, and thus, to avoid needles repetition of description, it is deemed sufficient merely to apply the proper designating reference numerals to these articles of hardware and to the component parts thereof.

The supporting panels 16 for the slab portion S' of the monolithic structure SB are supported upon the support bars 44 of the stringers 14 with the short dimension frame members 22 lying behind the protuberances 164, as shown at the extreme right-hand side of FIG. 4. The regions of the slab part S' in the vicinity of the beam part B' are supported upon elongated form pieces 350 having horizontal supporting parts 352 and vertical supporting parts 354. Below the form pieces 350, additional form pieces 356 rest upon angle pieces 358 supported on one or more wooden members 360. The members 360 are, in turn, supported upon the upper end of a stringer 362, which may be in the form of a conventional I-beam having top and bottom flanges 364 and 366, respectively, and an interconnecting web 368. The bottom flange 366 is provided with holes 370 therethrough designed for cooperation with the rivets 135 associated with one of the short brackets 30 which is supported upon the upper end of a shore 12, the shore and bracket serving to support the wooden member 360.

The form piece 350 is provided with a downturned flange 372 which rests upon one of the vertically adjustable support bars 44 behind the protuberance 164, this support bar being associated with another shore bracket 30 carried at the top of a shore 12.

From the above description, it will be seen that in producing such a form for monolithic pouring operations, the form parts which support the slab portion S' of the installation may be adjusted by a workman operating above the level of the panels 16 or below the same in the manner previously described, using either a torque-applying wrench from above on the elevation screw 84 (not shown in FIG. 41) associated with the upper shore section 56 of the particular shore which supports the panels 16, or a spanner wrench in connection with the spanner holes 108 from below. Similarly, before the concrete has been poured, the elevation of the wooden support member 360 may be adjusted either from above or from below this member.

Prior to concrete-pouring operations, a series of reinforcing rods 376 may be placed in position within the form structure and reinforcing rods 378 may be installed in the slab region of the form.

*Small Exterior Transverse Dimension Make-Up Operation, Example 1*

In FIG. 44 there has been illustrated an instance wherein the last stringer at one side of an installation runs parallel to and is slightly spaced from a previously formed concrete beam B2. The small dimension between the stringer and the adjacent surface 500 of the beam B2 is filled-in with a small make-up piece 502 in the form of a tubular member which, in the present instance, is substantially square in transverse cross section. The shore 12, shore bracket 30, and the stringers 14, which support the ultimately-to-be-poured slab S, remain substantially the same as in the previously described installations so that by application of the same reference numerals to the various parts associated with these elements, repetition of description may be avoided.

In this installation, one of the support bars 24 serves to support the ends of the panels, while the other support bar 24 serves to support the small make-up piece 502 when these support bars are in their raised upper positions. By lowering the support bars 24 in the manner previously described, both the panels 16 and the small make-up piece 502 are released while the support for the underneath side of the slab S offered by the shores 12 and stringers 14 is not affected.

The illustration of FIG. 44 is predicated upon an instance where there is no longitudinal make-up dimension to be considered, and in such an instance, the stringers 14 employed will be of the nonadjustable type. It will be understood that if such a longitudinal odd make-up dimension must be contended with, this longitudinal dimension will be compensated for by the use of adjustable stringers 40 in place of the nonadjustable stringers 14.

*Small Exterior Longitudinal Dimension Make-Up Operation*

In FIG. 45 there has been illustrated an instance wherein the various stringers 14 extend perpendicular to the adjacent face 550 of the beam B3 so that it is necessary to fill-in the external dimension represented by the distance between the face 550 and the side of the adjacent shore bracket 30. This latter small dimension is filled-in with a special fragmentary stringer section or make-up piece 552 in the form of a short I-beam section having a top flange 554 adapted to lie flush with the upper face 556 of the beam B3, as well as with the upper face of the elastomeric grout seal 139 associated with the tubular body portion 120 of the shore bracket 30. The I-beam is also provided with a bottom flange 560 having holes 561 therein which cooperate with the shank portions of the rivets 135 in the manner previously described in connection with both the nonadjustable and the adjustable stringers 14 and 40, respectively, to lock the I-beam in its supported position on the shore bracket 30. Small holes 563 in the angle pieces 134 of the shore bracket 30 are adapted to register with a hole 565 formed in the web 567 of the I-beam and a locking pin 569 is adapted to be passed through the three holes to lock the bracket 30 and make-up piece 552 together.

The web portion 567 of the make-up piece 552 has provided on opposite sides thereof a pair of vertically movable supports 564 in the form of open-sided, generally triangular, box-like structures which are movable vertically relative to the web 562 within limits defined by a pair of angle slots 566. The supports 564 are constrained to move between elevated and lowered positions by means of nut and bolt assemblies 568 which pass through the angle slots 566, the movements of the supports 564 being similar to that described in connection with the angle supports 250 described in connection with the structure shown in FIG. 19.

It is to be understood, of course, that the supports 564 are provided for the purpose of supporting adjacent ends of fill-in pieces (not shown) which may be in the form of panels or the like which are disposed between the face 550 of the beam B3 and the adjacent edges of any panels which may be supported on the support bar 24 associated with the stringer 14. The shore 12 and shore bracket 30 shown in this view are substantially the same as those previously described in connection with other installations, and corresponding reference numerals have been applied to the various equivalent parts thereof.

The make-up piece 552 is adapted to remain as a part of the installation until such time as the shoring and stringers are removed. However, the fill-in panels which rest upon the support 564 may be removed from the installations at the same time the panels 16 which are carried upon the support bars 24 are removed. It is merely necessary to loosen the nut and bolt assemblies 568 and drop the supports 564, whereupon the fill-in panels are released for removal purposes.

*Small Exterior Transverse Dimension Make-Up Operation, Example 2*

In the illustration of FIG. 47, the structure is similar to that illustrated in FIG. 44, with the exception that the external dimension existing between the vertical face 500 of the beam B3 and the tubular body portion 120 of the shore bracket 30 is accommodated by the use of one of the make-up pieces 552 instead of by the stringer 14. Also, the longitudinally extending row of stringers 14 have been omitted and individual shores 12 installed at the regions where adjacent panel edges are to be supported. The shore brackets 30 are installed on the upper ends of the shores 12 so that the channel section 122 thereof extends transversely of the slab S instead of longitudinally thereof. On one side of the shore bracket 30, in a direction extending transversely of the slab S, the shore bracket connects with one of the adjustable supports 400 illustrated in FIG. 48.

On the other side of the shore bracket 30, the same connects with one of the make-up pieces 552, the latter abutting against the face 500 of the beam B3.

When the support 564 of the make-up piece 552 is in its raised position, the adjacent end of the panel 16 will be supported thereby. When the support 564 is in its lowered position, the ends of the panel will be released for removal purposes while the make-up piece 552 will continue to lend support to the slab S.

The invention is not to be limited to the exact arrangement, construction or design of concrete hardware shown in the accompanying drawings or described in this specification since various changes in the details of construction thereof are contemplated. Neither is the invention to be limited to the environmental disclosures for such hardware made herein, since a wide variety of other environments and adaptations are possible. Therefore, only insofar as the invention has particularly been pointed out in the accompanying claims is the same to be limited.

Having thus described the invention what we claim as new and desire to secure by Letters Patent is:

1. In a concrete form installation for producing, in a building construction, a horizontal expansive floor slab, in combination, a plurality of vertically disposed extensible and contractible threaded telescopic sectional shores arranged in spaced relationship and in spaced parallel rows extending longitudinally of the installation, each shore including a fixed lower section and a rotatable upper section from which there extends upwardly a rod-like extension, a non-rotatable tubular shore bracket, coaxial with the upper section, having its lower end supported upon the rotatable upper section, encompassing said extension coaxially therewith, and having an open upper rim terminating above the level of the upper end of the extension, and means on opposite sides of said shore bracket establishing two longitudinally and oppositely projecting stringer-supporting ledges, a series of horizontal aligned elongated narrow stringers arranged in end-to-end relationship, extending between and abutting the shore brackets of adjacent shores of each row, having their ends loosely supported upon the opposed ledges of the shore brackets and having their upper edge surfaces lying substantially in the common horizontal plane of the rims of said shore brackets, a plurality of horizontal elongated transversely extending form panels operatively disposed between each pair of adjacent series of aligned stringers, having their side edges abutting each other and their end edges abutting the stringers, and presenting panel facings which lie in said horizontal plane and, in combination with the upper edge surfaces of the stringers, define a smooth upwardly facing slab-supporting surface upon which wet concrete for slab-forming purposes is adapted to be poured and which is unbroken except for the voids which exist by reason of the open upper rims of the shore brackets, vertically adjustable means on each stringer disposed below the level of said panels and removably supporting the ends of the panels in their operative positions, wrench-receiving surfaces on the upper ends of rod-like extensions and within the shore brackets whereby the extensions, and consequently, the upper sections of the shores, may be turned by insertion of a torque-applying wrench downwardly through the upper rims of the tubular shore brackets, and a removable sealing member closing the upper open rim of each shore bracket and presenting an upper surface lying substantially in the horizontal plane of said panel facings and said upper edge surfaces of the stringers.

2. In a concrete form installation, the combination set forth in claim 1, including, additionally, interlocking pilot means between each stringer-supporting ledge and the adjacent end of the associated stringer for preventing axial and transverse sliding movement of the stringer with respect to said ledge.

3. In a concrete form installation, the combination set forth in claim 2 and wherein said interlocking pilot means comprises an upstanding pin which is fixedly connected to the ledge and projects loosely through a hole in the adjacent end of the associated stringer.

4. In a concrete form installation, the combination set forth in claim 1, including, additionally, interlocking means between the ends of the panels and the vertically adjustable panel supporting means on the stringers for preventing transverse separation of the ends of the panels from the stringers during application of said panel ends in position against the stringers.

5. In a concrete form installation, the combination set forth in claim 1 and wherein the width of each panel in the longitudinal direction of the installation is a multiple of a given unit dimension, the distance between certain adjacent pairs of shores in each row of shores is a multiple of such unit dimension, the stringers between such adjacent pairs of shores have fixed lengths which are multiples of such unit dimension so that they completely span the distance between such adjacent pairs of shores, and the distance between at least one pair of adjacent shores in each row presents an odd dimension in excess of said unit dimension, said installation including, additionally, an adjustable length stringer comprised of telescopic sections extending between and abutting the shore brackets of the latter pair of shore brackets, and having their ends loosely supported upon the opposed ledges thereof with the upper edge surface of such adjustable length stringer lying substantially in the commonly horizontal plane of the rims of the shore brackets, a plurality of transversely extending form panels disposed between each adjacent pair of adjustable length stringers with their side edges abutting each other and with their end edges abutting tthe adjustable length stringers, and presenting panel facings which lie in said horizontal plane, one of said panels having a width in the longitudinal direction of the installation which is commensurate with said odd dimension, and vertically adjustable means on each adjustable length stringer disposed below the level of the adjacent panels and removably supporting the ends of the panels in their operative positions.

6. A concrete form installation for producing, in a building construction, a horizontal floor slab, said installation comprising a plurality of spaced apart vertical shores arranged in spaced parallel rows extending longitudinally of the installation, said shores being vertically adjustable and having their upper end brackets each of which embodies a pair of horizontal channel-shaped ledge-forming members extending outwards in opposite directions and lengthwise of the installation, a series of elongated narrow stringers arranged in end-to-end relationship and substantial contiguity and alignment, having the ends thereof mounted in and connected removably to said ledge-forming members of the brackets on the upper ends of the shores of each row, and bridging the distances between adjacent shores of the row, said stringers being in the form of I-beams and presenting upper edge surfaces which lie in a common horizontal plane, a plurality of form panels disposed between each series of aligned stringers and presenting panel facings which lie in said horizontal plane and, in combination with said upper edge surfaces of the stringers, define a smooth unbroken upwardly facing slab-supporting surface upon which the wet concrete of the slab is adapted to be poured, horizontal supporting rails movably mounted on the sides of the stringers and capable of limited vertical movements between a raised panel-supporting position and a lowered panel-releasing position, said rails, when in their raised positions, presenting upwardly facing panel-supporting surfaces which are spaced downwardly from said horizontal plane a distance equal to the thickness of the panels supported on such surfaces, and means for releasably supporting said supports in their raised position.

7. A concrete form installation as set forth in claim 6 and including, additionally, interengaging means on the upper regions of said tubular shore brackets and the adjacent ends of the stringers for preventing lateral tilting of the stringers with respect to the brackets.

8. A concrete form installation as set forth in claim 6 and including, additionally, interengaging means on the lower regions of the shore brackets and the adjacent ends of the stringers for preventing lateral shifting of the stringers with respect to the brackets.

9. A concrete form installation as set forth in claim 6 and including, additionally, a horizontally extending inter-stringer connecting member positioned normally transversely between a pair of opposed stringers, having means at the ends thereof for detachable connection to said stringers, having the upper portions thereof positioned direcly beneath and serving to support a superjacent panel when the latter is in its raised position, and designed so that when the detachable connecting means is released, it may be lowered vertically away from said stringers for panel-releasing purposes.

10. A concrete form installation as set forth in claim 1 and including, additionally, a horizontally extending inter-stringer connecting member positioned normally transversely between a pair of opposed stringers, having means at the ends thereof for detachable connection to the bottom flanges of said stringers, having the upper portions thereof positioned directly beneath the panels when the latter are in their raised position, and designed so that when the detachable connecting means is released, they may be lowered vertically away from said stringers.

11. A concrete form installation as set forth in claim 10 and wherein the inter-stringer connecting member is so designed and constructed that it may be adjusted in length and having on one side thereof a horizontal vertically adjustable rail for panel-supporting purposes.

References Cited in the file of this patent
UNITED STATES PATENTS

| | | |
|---|---|---|
| 1,533,960 | Wells | Apr. 14, 1925 |
| 1,546,586 | Johnson | July 21, 1925 |
| 1,555,243 | Garlinghouse | Sept. 29, 1925 |
| 1,596,868 | Brynoldt | Aug. 24, 1926 |
| 2,377,944 | Kohlhaas | June 12, 1945 |
| 2,446,255 | Vocisano | Aug. 3, 1948 |
| 2,564,935 | Templeton | Aug. 21, 1951 |
| 2,570,282 | Speck et al. | Oct. 9, 1951 |
| 2,684,824 | Hillberg | July 27, 1954 |
| 2,894,312 | Jones et al. | July 14, 1959 |
| 2,949,982 | Cobi | Aug. 23, 1960 |
| 2,951,564 | Meyer | Sept. 6, 1960 |
| 2,966,718 | Dave | Jan. 3, 1961 |
| 2,974,762 | Hunnebeck | Mar. 14, 1961 |